(12) United States Patent
Yamamoto et al.

(10) Patent No.: US 11,216,677 B2
(45) Date of Patent: Jan. 4, 2022

(54) SIGNAL PROCESSING APPARATUS, SIGNAL PROCESSING METHOD, PROGRAM, AND MOVING BODY

(71) Applicant: Sony Corporation, Tokyo (JP)

(72) Inventors: Keitaro Yamamoto, Tokyo (JP); Shinichiro Abe, Kanagawa (JP); Masahiko Toyoshi, Tokyo (JP); Shun Lee, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/644,253

(22) PCT Filed: Aug. 28, 2018

(86) PCT No.: PCT/JP2018/031662
§ 371 (c)(1),
(2) Date: Mar. 4, 2020

(87) PCT Pub. No.: WO2019/049712
PCT Pub. Date: Mar. 14, 2019

(65) Prior Publication Data
US 2021/0064893 A1    Mar. 4, 2021

(30) Foreign Application Priority Data

Sep. 11, 2017    (JP) .............................. JP2017-173963

(51) Int. Cl.
*G06K 9/00* (2006.01)
*G06T 7/73* (2017.01)
(Continued)

(52) U.S. Cl.
CPC .......... *G06K 9/00825* (2013.01); *G01S 19/42* (2013.01); *G05D 1/0212* (2013.01);
(Continued)

(58) Field of Classification Search
None
See application file for complete search history.

(56) References Cited

U.S. PATENT DOCUMENTS 4,357,085 A * 11/1982 Niwa ...................... G02B 7/32
250/201.4
6,718,259 B1    4/2004 Khosla
(Continued)

FOREIGN PATENT DOCUMENTS

EP      1 400 916 A2    3/2004
JP      2004104646 A    4/2004
(Continued)

OTHER PUBLICATIONS

International Search Report and Written Opinion in connection with International Application No. PCT/JP2018/031662 dated Jan. 15, 2019.

*Primary Examiner* — Santiago Garcia
(74) *Attorney, Agent, or Firm* — Wolf, Greenfield & Sacks, P.C.

(57) ABSTRACT

To improve estimation accuracy of a self-position. Light at a predetermined wavelength is projected. An image of a reflector with a reflectance higher than a predetermined reflectance is taken by receiving reflected light of the projected light reflected by the reflector. Own orientation is estimated on the basis of the taken image of the reflector. As a result, the self-position can be highly accurately estimated on the basis of the reflector even at night. The present disclosure can be applied to an on-board system.

16 Claims, 15 Drawing Sheets

(51) Int. Cl.
*G01S 19/42* (2010.01)
*G05D 1/02* (2020.01)
*G06K 9/32* (2006.01)
*G06K 9/46* (2006.01)

(52) U.S. Cl.
CPC ......... *G05D 1/0244* (2013.01); *G05D 1/0246* (2013.01); *G06K 9/00798* (2013.01); *G06K 9/00818* (2013.01); *G06K 9/3233* (2013.01); *G06K 9/4661* (2013.01); *G06T 7/73* (2017.01); *G06T 2207/10048* (2013.01); *G06T 2207/30256* (2013.01)

(56) References Cited

U.S. PATENT DOCUMENTS

| | | | |
|---|---|---|---|
| 9,690,997 B2 * | 6/2017 | Murao | G06K 9/00825 |
| 10,046,716 B2 * | 8/2018 | Okuda | B60W 10/30 |
| 2004/0091133 A1 * | 5/2004 | Monji | H04N 5/332 |
| | | | 382/104 |
| 2007/0065004 A1 * | 3/2007 | Kochi | G01C 15/02 |
| | | | 382/162 |
| 2010/0253597 A1 | 10/2010 | Seder et al. | |
| 2016/0034771 A1 * | 2/2016 | Schamp | B60G 17/019 |
| | | | 348/148 |
| 2017/0061231 A1 | 3/2017 | Higa | |
| 2017/0128151 A1 * | 5/2017 | Wang | A61B 90/361 |

FOREIGN PATENT DOCUMENTS

| | | |
|---|---|---|
| JP | 2016-197046 A | 11/2016 |
| WO | WO 2012/172870 A1 | 12/2012 |

* cited by examiner

SIGNAL PROCESSING APPARATUS, SIGNAL PROCESSING METHOD, PROGRAM, AND MOVING BODY

CROSS-REFERENCE TO RELATED APPLICATIONS

This application claims the benefit under 35 U.S.C. § 371 as a U.S. National Stage Entry of International Application No. PCT/JP2018/031662, filed in the Japanese Patent Office as a Receiving Office on Aug. 28, 2018, which claims priority to Japanese Patent Application Number JP2017-173963, filed in the Japanese Patent Office on Sep. 11, 2017, each of which is hereby incorporated by reference herein in its entirety.

TECHNICAL FIELD

The present disclosure relates to a signal processing apparatus, a signal processing method, a program, and a moving body, and particularly, to a signal processing apparatus, a signal processing method, a program, and a moving body that can highly accurately estimate a self-position.

BACKGROUND ART

A technique of recognizing a situation of own surroundings to estimate a self-position is proposed to realize automatic drive.

For example, a technique is proposed, in which the distance to an object is calculated on the basis of an image using the time change of feature points or using an edge projector to thereby create an environment map (see PTL 1).

A technique is also proposed, in which a projector that periodically changes the luminance is used to extract reflected light synchronized with the change in the luminance to thereby detect reflecting objects and recognize the surroundings to estimate the self-position (see PTL 2).

CITATION LIST

Patent Literature

PTL 1: International Publication No. WO 2012/172870
PTL 2: JP 2016-197046A

SUMMARY OF INVENTION

Technical Problem

However, in the case of extracting the feature points from the image as in PTL 1, the accuracy of extracting the feature points may be reduced in a case where it is dark at night, and as a result, the accuracy of estimating the self-position may be reduced.

In addition, in the technique of PTL 1, the accuracy of extracting the feature points may be reduced if the image includes high-luminance saturated pixel regions, such as reflectors and glare from a light source.

Furthermore, in the case of PTL 2, if an oncoming car uses the same system, direct light from projectors of both cars may lead to misdetection.

The present disclosure has been made in view of the circumstances, and the present disclosure particularly improves estimation accuracy of a self-position.

Solution to Problem

An aspect of the present disclosure provides a signal processing apparatus including: a light projection unit that projects light at a predetermined wavelength; a light-receiving unit that takes an image of an object with a reflectance higher than a predetermined reflectance by receiving reflected light of the light projected by the light projection unit and reflected by the object; and an orientation estimation unit that estimates own orientation on the basis of the image taken by the light-receiving unit.

The signal processing apparatus can further include an object detection region extraction unit that obtains a difference image of an image in a state in which the light projection unit projects the light at the predetermined wavelength and an image in a state in which the light projection unit extinguishes the light at the predetermined wavelength and that extracts object detection regions that are regions with a luminance higher than a predetermined value, in which the orientation estimation unit can estimate the own orientation on the basis of the object detection regions.

The object detection region extraction unit can extract object detection regions in the difference image that are regions with a luminance higher than a predetermined value and with an area larger than a predetermined area.

The signal processing apparatus can further include a first feature point extraction unit that extracts first feature points that are centers of gravity of the regions extracted as the object detection regions, in which the orientation estimation unit can estimate the own orientation on the basis of information of the first feature points including the centers of gravity.

The signal processing apparatus can further include: an imaging unit that takes an image of a range where the light projection unit projects the light at the predetermined wavelength; a second feature point extraction unit that extracts second feature points including corners from the image taken by the imaging unit; an image usage orientation estimation unit that estimates an orientation on the basis of the second feature points including the corners; and an integration unit that integrates an estimation result of the own orientation obtained based on the image taken by the light-receiving unit and an image usage orientation estimation result that is the orientation estimated by the image usage orientation estimation unit.

The signal processing apparatus can further include: an acquisition unit that acquires GPS (Global Positioning System) data and IMU (Inertial Measurement Unit) data; and a GPS IMU usage orientation estimation unit that estimates an orientation on the basis of the GPS data and the IMU data acquired by the acquisition unit, in which the integration unit can integrate the estimation result of the own orientation based on the image taken by the light-receiving unit, the image usage orientation estimation result that is the orientation estimated by the image usage orientation estimation unit, and a GPS IMU usage orientation estimation result that is the orientation estimated by the GPS IMU usage orientation estimation unit.

The signal processing apparatus can further include a data acquisition situation detection unit that detects a data acquisition situation of the light-receiving unit, a data acquisition situation of the imaging unit, and a data acquisition situation of the GPS data and the IMU data, in which the integration unit can weight and integrate the estimation result of the own orientation, the image usage orientation estimation result, and the GPS IMU usage orientation estimation result on the basis of the data acquisition situation of the light-receiving unit, the data acquisition situation of the imaging unit, and the data acquisition situation of the GPS data and the IMU data.

The integration unit can use a Bayesian filter or an EKF (Extended Kalman Filter) to integrate the estimation result of the own orientation, the image usage orientation estimation result, and the GPS IMU usage orientation estimation result.

The orientation estimation unit can estimate the own orientation on the basis of SLAM (Simultaneous Localization And Mapping) using the information of the first feature points.

The object can include a reflector, a minor, a road sign, or a center line on a road.

The wavelength of the light projected by the light projection unit can be in a near-infrared band.

The light projection unit can project and extinguish light at a plurality of wavelengths at predetermined intervals.

An aspect of the present disclosure provides a signal processing method including: a light projection process of projecting light at a predetermined wavelength; a light-receiving process of taking an image of an object with a reflectance higher than a predetermined reflectance by receiving reflected light of the light projected in the light projection process and reflected by the object; and an orientation estimation process of estimating own orientation on the basis of the image taken in the light-receiving process.

An aspect of the present disclosure provides a program causing a computer to execute processes including: a light projection unit that projects light at a predetermined wavelength; a light-receiving unit that takes an image of an object with a reflectance higher than a predetermined reflectance by receiving reflected light of the light projected by the light projection unit and reflected by the object; and an orientation estimation unit that estimates own orientation on the basis of the image taken by the light-receiving unit.

An aspect of the preset disclosure provides a moving body including: a light projection unit that projects light at a predetermined wavelength; a light-receiving unit that takes an image of an object with a reflectance higher than a predetermined reflectance by receiving reflected light of the light projected by the light projection unit and reflected by the object; an orientation estimation unit that estimates own orientation on the basis of the image taken by the light-receiving unit; a situation analysis unit that analyzes a situation on the basis of the orientation estimated by the orientation estimation unit; a planning unit that generates an action plan on the basis of an analysis result of the situation analysis unit; and a motion control unit that controls a motion on the basis of the action plan.

In the aspects of the present disclosure, light is projected at a predetermined wavelength, an image of an object with a reflectance higher than a predetermined reflectance is taken by receiving reflected light of the projected light reflected by the object, and own orientation is estimated on the basis of the taken image.

Advantageous Effects of Invention

According to the aspects of the present disclosure, estimation accuracy of a self-position can be particularly improved.

DESCRIPTION OF EMBODIMENTS

Hereinafter, a preferred embodiment of the present disclosure will be described in detail with reference to the accompanying drawings. Note that in the present specification and the drawings, the same reference signs are provided to constituent elements with substantially the same functional configurations, and the description will not be repeated.

Hereinafter, the embodiment of the present technique will be described. The embodiment will be described in the following order.

1. Preferred Embodiment of Present Disclosure
2. Modification
3. Example of Execution by Software.

1. Preferred Embodiment

<Configuration Example of Vehicle Control System of Present Disclosure>

A moving body of the present disclosure is a moving body that highly accurately detects reflectors of the surroundings to recognize own orientation (self-position and direction) on the basis of a detection result. Although an example of a case where the moving body of the present disclosure is a vehicle will be described below, the moving body may not be a vehicle as long as it is a moving body.

Figure 1:
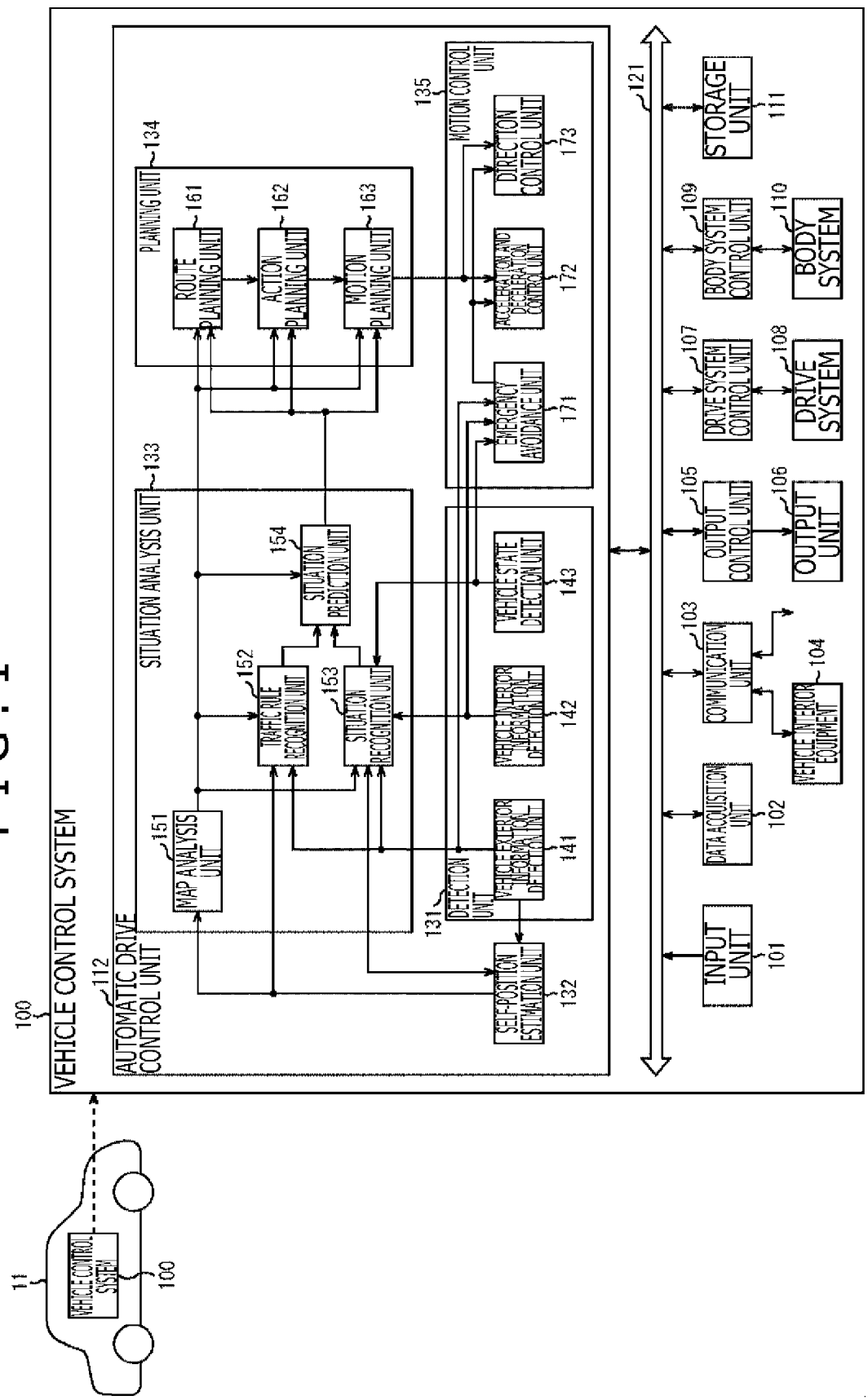
FIG. 1 is a block diagram describing a configuration example of a moving body control system that controls a moving body of the present disclosure.

FIG. 1 is a block diagram illustrating a configuration example of schematic functions of a vehicle control system 100 mounted on a vehicle 11 as an example of a moving body control system to which the present technique can be applied.

Note that the vehicle 11 provided with the vehicle control system 100 will be referred to as own car or own vehicle to distinguish the vehicle 11 from other vehicles.

The vehicle control system 100 includes an input unit 101, a data acquisition unit 102, a communication unit 103, vehicle interior equipment 104, an output control unit 105, an output unit 106, a drive system control unit 107, a drive system 108, a body system control unit 109, a body system 110, a storage unit 111, and an automatic drive control unit 112. The input unit 101, the data acquisition unit 102, the communication unit 103, the output control unit 105, the drive system control unit 107, the body system control unit 109, the storage unit 111, and the automatic drive control unit 112 are connected to each other through a communication network 121. The communication network 121 includes, for example, an on-board communication network, a bus, and the like in compliance with an arbitrary standard, such as CAN (Controller Area Network), LIN (Local Interconnect Network), LAN (Local Area Network), and FlexRay (registered trademark). Note that the components of the vehicle control system 100 are directly connected in some cases without the involvement of the communication network 121.

Note that in a case where the components of the vehicle control system 100 communicate through the communication network 121, the description of the communication network 121 will be omitted. For example, a case where the input unit 101 and the automatic drive control unit 112 communicate through the communication network 121 will be simply described as communication between the input unit 101 and the automatic drive control unit 112.

The input unit 101 includes apparatuses used by an occupant to input various data, instructions, and the like. For example, the input unit 101 includes operation devices, such as a touch panel, a button, a microphone, a switch, and a lever, operation devices that enable input using methods other than manual operation, such as sound and gesture, and the like. The input unit 101 may also be, for example, external connection equipment, such as a remote control apparatus using infrared rays or other radio waves and mobile equipment or wearable equipment corresponding to the operation of the vehicle control system 100. The input unit 101 generates an input signal on the basis of data, an instruction, or the like input by the occupant and supplies the input signal to each component of the vehicle control system 100.

The data acquisition unit 102 includes various sensors and the like that acquire data used for processing by the vehicle control system 100 and supplies the acquired data to each component of the vehicle control system 100.

For example, the data acquisition unit 102 includes various sensors for detecting the state and the like of own car. Specifically, the data acquisition unit 102 includes, for example, a gyrosensor, an acceleration sensor, an inertial measurement apparatus (IMU), and sensors and the like for detecting the amount of operation of an accelerator pedal, the amount of operation of a brake pedal, the steering angle of a steering wheel, the engine speed, the motor speed, the rotational speed of a wheel, and the like.

The data acquisition unit 102 also includes, for example, various sensors for detecting external information of own car. Specifically, the data acquisition unit 102 includes, for example, an imaging apparatus, such as a ToF (Time Of Flight) camera, a stereo camera, a monocular camera, an infrared camera, and other cameras. The data acquisition unit 102 also includes, for example, an environment sensor for detecting the weather, climate conditions, and the like and a surrounding information detection sensor for detecting objects around own car. The environment sensor includes, for example, a rain sensor, a fog sensor, a solar sensor, a snow sensor, and the like. The surrounding information detection sensor includes, for example, an ultrasonic sensor, a radar, LiDAR (Light Detection and Ranging, Laser Imaging Detection and Ranging), a sonar, and the like.

The data acquisition unit 102 further includes, for example, various sensors that detect the current position of own car. Specifically, the data acquisition unit 102 includes, for example, a GNSS (Global Navigation Satellite System) receiver or the like that receives a GNSS signal from a GNSS satellite.

The data acquisition unit 102 also includes, for example, various sensors for detecting information of the vehicle interior. Specifically, the data acquisition unit 102 includes, for example, an imaging apparatus that images the driver, a biosensor that detects biological information of the driver, a microphone that collects sound inside of the compartment, and the like. The biosensor is provided on, for example, the seat surface, the steering wheel, or the like, and the biosensor detects biological information of the occupant sitting on the seat or the driver holding the steering wheel.

Note that in the present disclosure, the data acquisition unit 102 is also provided with a light projection unit 222 (FIG. 2) and a light-receiving unit 223 (FIG. 2) for detecting reflectors. The data acquisition unit 102 is also provided with a GPS IMU data acquisition unit 261 (FIG. 2) having a function similar to the GNSS satellite and configured to receive a GPS (Global Positioning System) signal of a GPS satellite and to acquire data of IMU (Inertial Measurement Unit).

The communication unit 103 communicates with the vehicle interior equipment 104 as well as various equipment, servers, base stations, and the like outside of the vehicle to transmit data supplied from each component of the vehicle control system 100 and to supply received data to each component of the vehicle control system 100. Note that the communication protocol supported by the communication unit 103 is not particularly limited, and the communication unit 103 can also support a plurality of types of communication protocols.

For example, the communication unit 103 wirelessly communicates with the vehicle interior equipment 104 through wireless LAN, Bluetooth (registered trademark), NFC (Near Field Communication), WUSB (Wireless USB), or the like. The communication unit 103 also uses USB (Universal Serial Bus), HDMI (High-Definition Multimedia Interface), MHL (Mobile High-definition Link), or the like to perform wired communication with the vehicle interior equipment 104 through, for example, a connection terminal (and a cable if necessary) not illustrated.

The communication unit 103 further communicates with, for example, equipment (for example, application server or control server) existing on an external network (for example, Internet, cloud network, or network specific to business) through a base station or an access point. The communication unit 103 also uses, for example, a P2P (Peer To Peer) technique to communicate with a terminal (for example, terminal of pedestrian or shop or MTC (Machine Type Communication) terminal) existing near own car. The communication unit 103 further performs, for example, V2X communication, such as vehicle-to-vehicle communication, vehicle-to-infrastructure communication, vehicle-to-home communication, and vehicle-to-pedestrian communication. The communication unit 103 also includes, for example, a beacon reception unit to receive a radio wave or an electromagnetic wave transmitted from a wireless station or the like installed on the road and to acquire information, such as current position, traffic jam, traffic regulation, and required time.

The vehicle interior equipment 104 includes, for example, mobile equipment or wearable equipment possessed by the occupant, information equipment carried in or attached to own car, a navigation apparatus that searches for a route to an arbitrary destination, and the like.

The output control unit 105 controls output of various types of information to the occupant of own car or to the outside of the vehicle. For example, the output control unit 105 generates an output signal including at least one of visual information (for example, image data) and auditory information (for example, audio data) and supplies the output signal to the output unit 106 to control the output of the visual information and the auditory information from the output unit 106. Specifically, for example, the output control unit 105 combines image data captured by different imaging apparatuses of the data acquisition unit 102 to generate a bird's-eye image, a panoramic image, or the like and supplies an output signal including the generated image to the output unit 106. In addition, for example, the output control unit 105 generates audio data including a warning sound, a warning message, or the like for danger, such as collision, contact, and entry into danger zone, and supplies an output signal including the generated audio data to the output unit 106.

The output unit 106 includes apparatuses that can output visual information or auditory information to the occupant of own car or to the outside of the vehicle. For example, the output unit 106 includes a display apparatus, an instrument panel, an audio speaker, headphones, a wearable device such as a head-mounted display worn by the occupant, a projector, a lamp, and the like. The display apparatus included in the output unit 106 may be, for example, an apparatus that displays visual information in the field of view of the driver, such as a head-up display, a transmissive display, and an apparatus with an AR (Augmented Reality) display function, instead of an apparatus including a normal display.

The drive system control unit 107 generates various control signals and supplies the control signals to the drive system 108 to control the drive system 108. The drive system control unit 107 also supplies control signals to components other than the drive system 108 as necessary to send a notification of the control state or the like of the drive system 108.

The drive system 108 includes various apparatuses regarding the driving system of own car. For example, the drive system 108 includes a driving force generation apparatus for generating driving force of the internal combustion engine, the driving motor, or the like, a driving force transmission mechanism for transmitting driving force to the wheel, a steering mechanism that adjusts the steering angle, a braking apparatus that generates braking force, an ABS (Antilock Brake System), an ESC (Electronic Stability Control), an electric power steering apparatus, and the like.

The body system control unit 109 generates various control signals and supplies the control signals to the body system 110 to control the body system 110. The body system control unit 109 also supplies control signals to components other than the body system 110 as necessary to send a notification of the control state or the like of the body system 110.

The body system 110 includes various apparatuses of the body system equipped in the vehicle body. For example, the body system 110 includes a keyless entry system, a smart key system, a power window apparatus, a power seat, a steering wheel, an air conditioner, various lamps (for example, headlamp, back lamp, brake lamp, turn signal, and fog lamp), and the like.

The storage unit 111 includes, for example, a magnetic storage device, such as a ROM (Read Only Memory), a RAM (Random Access Memory), and an HDD (Hard Disc Drive), a semiconductor storage device, an optical storage device, a magneto-optical storage device, or the like. The storage unit 111 stores various programs, data, and the like used by the components of the vehicle control system 100. For example, the storage unit 111 stores map data, such as a three-dimensional highly accurate map like a dynamic map, a global map with a lower accuracy than the highly accurate map and with a wide coverage area, a local map including information around own car, and the like.

The automatic drive control unit 112 performs control regarding automatic drive, such as autonomous traveling and driving support. Specifically, the automatic drive control unit 112 performs, for example, cooperative control for realizing functions of ADAS (Advanced Driver Assistance System) including avoidance of collision or shock mitigation of own car, follow-up traveling based on the following distance, traveling at a constant speed, collision warning of own car, lane departure warning of own car, and the like. The automatic drive control unit 112 also performs, for example, cooperative control for automatic drive or the like for autonomous traveling without the operation of the driver. The automatic drive control unit 112 includes a detection unit 131, a self-position estimation unit 132, a situation analysis unit 133, a planning unit 134, and a motion control unit 135.

The detection unit 131 detects various types of information necessary for controlling the automatic drive. The detection unit 131 includes a vehicle exterior information detection unit 141, a vehicle interior information detection unit 142, and a vehicle state detection unit 143.

The vehicle exterior information detection unit 141 executes a detection process of information outside of own car on the basis of data or a signal from each component of the vehicle control system 100. For example, the vehicle exterior information detection unit 141 executes a detection process, a recognition process, and a tracking process of objects around own car and executes a detection process of distances to the objects. Examples of the objects to be detected include vehicles, persons, obstacles, structures, roads, traffic lights, traffic signs, and road markings. The vehicle exterior information detection unit 141 also executes, for example, a detection process of the environment around own car. Examples of the environment of the surroundings to be detected include weather, temperature, humidity, brightness, and state of road surface. The vehicle exterior information detection unit 141 supplies data indicating results of the detection process to the self-position estimation unit 132, to a map analysis unit 151, a traffic rule recognition unit 152, and a situation recognition unit 153 of the situation analysis unit 133, to an emergency avoidance unit 171 of the motion control unit 135, and the like.

The vehicle interior information detection unit 142 executes a detection process of information of the vehicle interior on the basis of data or a signal from each component of the vehicle control system 100. For example, the vehicle interior information detection unit 142 executes an authentication process and a recognition process of the driver, a detection process of the state of the driver, a detection process of the occupant, a detection process of the environment of the vehicle interior, and the like. Examples of the state of the driver to be detected include physical condition, alertness, concentration, fatigue, and eye direction. Examples of the environment of the vehicle interior to be detected include temperature, humidity, brightness, and smell. The vehicle interior information detection unit 142 supplies data indicating results of the detection process to the situation recognition unit 153 of the situation analysis unit 133, the emergency avoidance unit 171 of the motion control unit 135, and the like.

The vehicle state detection unit 143 executes a detection process of the state of own car on the basis of data or a signal from each component of the vehicle control system 100. Examples of the state of own car to be detected include velocity, acceleration, steering angle, presence/absence and details of abnormality, state of driving operation, position and inclination of power seat, state of door lock, and states of other on-board equipment. The vehicle state detection unit 143 supplies data indicating results of the detection process to the situation recognition unit 153 of the situation analysis unit 133, the emergency avoidance unit 171 of the motion control unit 135, and the like.

The self-position estimation unit 132 executes an estimation process of the position, the orientation, and the like of own car on the basis of data or a signal from each component of the vehicle control system 100, such as the vehicle exterior information detection unit 141 and the situation recognition unit 153 of the situation analysis unit 133. The self-position estimation unit 132 also generates a local map to be used to estimate the self-position (hereinafter, referred to as self-position estimation map) as necessary. The self-position estimation map is, for example, a highly accurate map using a technique of SLAM (Simultaneous Localization and Mapping) or the like. The self-position estimation unit 132 supplies data indicating results of the estimation process to the map analysis unit 151, the traffic rule recognition unit 152, and the situation recognition unit 153 of the situation analysis unit 133 and the like. The self-position estimation unit 132 also causes the storage unit 111 to store the self-position estimation map.

The situation analysis unit 133 executes an analysis process of the situation of own car and the surroundings. The situation analysis unit 133 includes the map analysis unit 151, the traffic rule recognition unit 152, the situation recognition unit 153, and a situation prediction unit 154.

The map analysis unit 151 uses data or a signal from each component of the vehicle control system 100, such as the self-position estimation unit 132 and the vehicle exterior information detection unit 141, as necessary to execute an analysis process of various maps stored in the storage unit 111 to construct a map including information necessary for the process of automatic drive. The map analysis unit 151 supplies the constructed map to the traffic rule recognition unit 152, the situation recognition unit 153, the situation prediction unit 154, as well as a route planning unit 161, an action planning unit 162, and a motion planning unit 163 of the planning unit 134, and the like.

The traffic rule recognition unit 152 executes a recognition process of a traffic rule around own car on the basis of data or a signal from each component of the vehicle control system 100, such as the self-position estimation unit 132, the vehicle exterior information detection unit 141, and the map analysis unit 151. As a result of the recognition process, for example, the positions and the states of signals around own car, the details of traffic regulations around own car, available lanes, and the like are recognized. The traffic rule recognition unit 152 supplies data indicating results of the recognition process to the situation prediction unit 154 and the like.

The situation recognition unit 153 executes a recognition process of the situation regarding own car on the basis of data or a signal from each component of the vehicle control system 100, such as the self-position estimation unit 132, the vehicle exterior information detection unit 141, the vehicle interior information detection unit 142, the vehicle state detection unit 143, and the map analysis unit 151. For example, the situation recognition unit 153 executes a recognition process of the situation of own car, the situation around own car, the situation of the driver of own car, and the like. The situation recognition unit 153 also generates a local map to be used to recognize the situation around own car (hereinafter, referred to as situation recognition map) as necessary. The situation recognition map is, for example, an occupancy grid map.

Examples of the situation of own car to be recognized include the position, the orientation, and the movement (for example, velocity, acceleration, movement direction, and the like) of own car as well as the presence/absence and the details of abnormality. Examples of the situation around own car to be recognized include the type and the position of a stationary object of the surroundings, the type, the position, and the movement (for example, velocity, acceleration, movement direction, and the like) of a moving object of the surroundings, the configuration of the road and the state of the road surface of the surroundings, and the weather, the temperature, the humidity, and the brightness of the surroundings. Examples of the state of the driver to be recognized include the physical condition, alertness, concentration, fatigue, eye movement, and driving operation.

The situation recognition unit 153 supplies data indicating results of the recognition process (including the situation recognition map as necessary) to the self-position estimation unit 132, the situation prediction unit 154, and the like. The situation recognition unit 153 also causes the storage unit 111 to store the situation recognition map.

The situation prediction unit 154 executes a prediction process of the situation regarding own car on the basis of data or a signal from each component of the vehicle control system 100, such as the map analysis unit 151, the traffic rule recognition unit 152, and the situation recognition unit 153. For example, the situation prediction unit 154 executes a prediction process of the situation of own car, the situation around own car, the situation of the driver, and the like.

Examples of the situation of own car to be predicted include behavior of own car, generation of abnormality, and possible travel distance. Examples of the situation around own car to be predicted include behavior of a moving object around own car, change in the state of a signal, and change in the environment such as weather. Examples of the situation of the driver to be predicted include behavior and physical condition of the driver.

The situation prediction unit 154 supplies data indicating results of the prediction process to the route planning unit 161, the action planning unit 162, and the motion planning unit 163 of the planning unit 134 and the like along with the data from the traffic rule recognition unit 152 and the situation recognition unit 153.

The route planning unit 161 plans a route to the destination on the basis of data or a signal from each component of the vehicle control system 100, such as the map analysis unit 151 and the situation prediction unit 154. For example, the route planning unit 161 sets the route from the current position to the designated destination on the basis of the global map. The route planning unit 161 also appropriately changes the route on the basis of, for example, the situation of traffic jam, accident, traffic regulation, and construction work, the physical condition of the driver, and the like. The route planning unit 161 supplies data indicating the planned route to the action planning unit 162 and the like.

The action planning unit 162 plans an action of own car for safely traveling the route planned by the route planning unit 161 within a planned time on the basis of data or a signal from each component of the vehicle control system 100, such as the map analysis unit 151 and the situation prediction unit 154. For example, the action planning unit 162 plans start, stop, traveling direction (for example, forward, backward, left turn, right turn, change of direction, or the like), driving lane, driving speed, passing, and the like. The action planning unit 162 supplies data indicating the planned action of own car to the motion planning unit 163 and the like.

The motion planning unit 163 plans a motion of own car for realizing the action planned by the action planning unit 162 on the basis of data or a signal from each component of the vehicle control system 100, such as the map analysis unit 151 and the situation prediction unit 154. For example, the motion planning unit 163 plans the acceleration, the deceleration, the traveling path, and the like. The motion planning unit 163 supplies data indicating the planned motion of own car to an acceleration and deceleration control unit 172 and a direction control unit 173 of the motion control unit 135 and the like.

The motion control unit 135 controls the motion of own car. The motion control unit 135 includes the emergency avoidance unit 171, the acceleration and deceleration control unit 172, and the direction control unit 173.

The emergency avoidance unit 171 executes a detection process of emergency, such as collision, contact, entry into danger zone, abnormality of driver, and abnormality of vehicle, on the basis of the detection results of the vehicle exterior information detection unit 141, the vehicle interior information detection unit 142, and the vehicle state detection unit 143. In a case where the emergency avoidance unit 171 detects an occurrence of emergency, the emergency avoidance unit 171 plans a motion of own car for avoiding the emergency, such as sudden stop and sharp turn. The emergency avoidance unit 171 supplies data indicating the planned motion of own car to the acceleration and deceleration control unit 172, the direction control unit 173, and the like.

The acceleration and deceleration control unit 172 controls the acceleration and deceleration for realizing the motion of own car planned by the motion planning unit 163 or the emergency avoidance unit 171. For example, the acceleration and deceleration control unit 172 computes a control target value of a driving force generation apparatus or a braking apparatus for realizing the planned acceleration, deceleration, or sudden stop and supplies a control command indicating the computed control target value to the drive system control unit 107.

The direction control unit 173 controls the direction for realizing the motion of own car planned by the motion planning unit 163 or the emergency avoidance unit 171. For example, the direction control unit 173 computes a control target value of a steering mechanism for realizing the traveling path or sharp turn planned by the motion planning unit 163 or the emergency avoidance unit 171 and supplies a control command indicating the computed control target value to the drive system control unit 107.

<Configuration Example of Estimating Own Orientation>

Next, a configuration example of estimating own orientation in the vehicle control system 100 of FIG. 1 will be described with reference to FIG. 2.

The configuration example of estimating own orientation includes the data acquisition unit 102 in the vehicle control system 100 of FIG. 1 as well as the vehicle exterior information detection unit 141 of the detection unit 131 and the self-position estimation unit 132 in the automatic drive control unit 112.

In addition, the data acquisition unit 102, the vehicle exterior information detection unit 141, and the self-position estimation unit 132 as components that estimate own orientation include a reflector usage orientation estimation unit 201, an image usage orientation estimation unit 202, a GPS IMU usage orientation estimation unit 203, a data acquisition situation detection unit 204, and an estimation result integration unit 205.

The reflector usage orientation estimation unit 201 projects light at a predetermined wavelength in a near-infrared band to the surroundings, takes an image of the range of the projected light, detects light reflected from reflectors in the taken image, and uses the positions of the detected reflectors to estimate a self-orientation. The reflector usage orientation estimation unit 201 outputs the estimation result as a reflector usage orientation estimation result to the estimation result integration unit 205.

Here, the self-orientation is information including a self-position and a self-direction. That is, the self-position is, for example, the position of the vehicle on the earth, and the self-direction is, for example, information indicating the direction (north, east, south, and west) on the earth that the vehicle is facing at the self-position when the self-position on the earth is obtained. In the present specification, the self-position and the direction will be collectively referred to as self-orientation, or simply as orientation.

More specifically, the reflector usage orientation estimation unit 201 includes a light projection adjustment unit 221, the light projection unit 222, the light-receiving unit 223, a reflector region extraction unit 224, a feature point (center of gravity) extraction unit 225, and an orientation estimation unit 226.

To prevent misdetection caused by interference when the light projection unit 222 projects light at the same wavelength in communication with another car in a surrounding area, the light projection adjustment unit 221 communicates with the other car to adjust the wavelength of the light projected by the light projection unit 222 and causes the light projection unit 222 to project light at the adjusted wavelength. More specifically, the light projection adjustment unit 221 communicates with another car in a surrounding area, and in a case where the wavelength of the light to be projected by the light projection unit 222 of the other car is the same, the light projection adjustment unit 221 compares serial numbers of both cars. The light projection adjustment unit 221 of the car with the larger serial number changes the wavelength of the light to be projected to thereby suppress the interference caused by projection of light at the same wavelength. Note that the communication with another car is, for example, vehicle-to-vehicle communication or the like using the communication unit 103.

The light projection unit 222 projects the light at the predetermined wavelength adjusted by the light projection adjustment unit 221 by repeating the projection and the extinction of the light at predetermined time intervals. Note that the time interval of repeating the projection and the extinction of the light will be referred to as one frame. Therefore, in a case where one cycle (one period) is a sum of one projection time period and one extinction time period, one cycle is two frames.

The light-receiving unit 223 is controlled by the light projection adjustment unit 221, and in the state in which the light at the predetermined adjusted wavelength can be received, the light-receiving unit 223 takes an image during projection and an image during extinction of the range where the light at the predetermined wavelength is projected by the light projection unit 222. The light-receiving unit 223 supplies the images to the reflector region extraction unit 224.

Note that details of specific configurations of the light projection unit 222 and the light-receiving unit 223 will be described later with reference to FIG. 3.

The reflector region extraction unit 224 obtains a difference image of the image during projection and the image during extinction and extracts and supplies reflector regions that are ranges with a luminance value higher than a predetermined value to the feature point (center of gravity) extraction unit 225. Note that details of the extraction method of the reflector regions will be described later with reference to FIG. 5.

The feature point (center of gravity) extraction unit 225 extracts feature points that are the positions of the centers of gravity of the detected reflector regions and supplies information of the feature points to the orientation estimation unit 226. Note that details of the extraction method of the feature points will be described later with reference to FIG. 6.

On the basis of the information of the feature points including the positions of the centers of gravity of the reflector regions, the orientation estimation unit 226 uses, for example, SLAM (Simultaneous Localization And Mapping) or the like to estimate own orientation and outputs the orientation as a reflector usage orientation estimation result to the estimation result integration unit 205.

The image usage orientation estimation unit 202 takes an image of the surroundings and uses information of the image that is a result of imaging to estimate the self-orientation. The image usage orientation estimation unit 202 outputs the self-orientation as an image usage orientation estimation result to the estimation result integration unit 205.

More specifically, the image usage orientation estimation unit 202 includes an image acquisition unit 241, a feature point extraction unit 242, and an orientation estimation unit 243. The image acquisition unit 241 is an imaging unit provided with an imaging element including, for example, a CMOS (Complementary Metal Oxide Semiconductor) image sensor or the like. The image acquisition unit 241 takes an image of the surroundings of the vehicle 11 and outputs the taken image to the feature point extraction unit 242.

The feature point extraction unit 242 extracts feature points including corner points or the like of, for example, Harris, SIFT, SURF, or the like on the basis of the image and outputs information of the extracted feature points to the orientation estimation unit 243.

On the basis of the information of the feature points supplied from the feature point extraction unit 242, the orientation estimation unit 243 uses, for example, SLAM (Simultaneous Localization And Mapping) or the like to estimate the self-orientation and outputs the self-orientation as an image usage orientation estimation result to the estimation result integration unit 205.

The GPS IMU usage orientation estimation unit 203 uses GPS data from a satellite of GPS (Global Positioning System) and IMU data as a measurement result of IMU (Inertial Measurement Unit) to estimate the self-orientation and outputs the self-orientation as a GPS IMU usage orientation estimation result to the estimation result integration unit 205.

The GPS IMU usage orientation estimation unit 203 includes the GPS IMU data acquisition unit 261 and an orientation estimation unit 262. The GPS IMU data acquisition unit 261 receives GPS data specifying the position on the earth transmitted from the GPS satellite and supplies the received GPS data to the orientation estimation unit 262. The GPS IMU data acquisition unit 261 also supplies IMU data including a measurement result measured by the inertial measurement apparatus including a gyrosensor and the like to the orientation estimation unit 262.

The orientation estimation unit 262 estimates the latitude and the longitude as position information on the earth on the basis of the GPS data transmitted from the GPS satellite to estimate the self-position and direction and outputs the self-position and direction to the estimation result integration unit 205. The orientation estimation unit 262 also estimates the position information on the earth on the basis of the IMU data including the measurement result supplied from the IMU to estimate the orientation.

Note that the orientation estimation unit 262 can realize relatively highly accurate orientation estimation on the basis of the GPS data as long as the GPS data can be acquired. However, there is a state in which the GPS data as a signal from the GPS satellite cannot be received, such as indoor and underground, and therefore, the orientation estimation unit 262 estimates the orientation in combination with the measurement result based on the IMT data.

The data acquisition situation detection unit 204 detects data acquisition situations of the reflector usage orientation estimation unit 201, the image usage orientation estimation unit 202, and the GPS IMU usage orientation estimation unit 203 and outputs data acquisition situation detection results as detection results to the estimation result integration unit 205.

More specifically, the data acquisition situation detection unit 204 outputs data acquisition situation detection results to the estimation result integration unit 205, the data acquisition situation detection results including, for example, information of the number of detected reflectors and the brightness of the surroundings that affect the accuracy of the reflector usage orientation estimation result, information of the brightness of the surroundings that affects the accuracy of the image usage orientation estimation result, information of the number of satellites acquiring the GPS data used for the position estimation of the GPS that affects the accuracy of the GPS IMU usage orientation estimation result, and information of the temperature and the degree of vibration that affect the bias error or the like of the inertial measurement apparatus.

The estimation result integration unit 205 weights the reflector usage orientation estimation result, the image usage orientation estimation result, and the GPS IMU usage orientation estimation result on the basis of the data acquisition situation detection results. The estimation result integration unit 205 uses, for example, a Bayesian filter, an EKF (Extended Kalman Filter), or the like to integrate the results and outputs an orientation estimation result.

<Configuration Examples of Light Projection Unit and Light-Receiving Unit>

Next, configuration examples of the light projection unit 222 and the light-receiving unit 223 will be described with reference to FIG. 3. Note that both the left and the right of the upper stage of FIG. 3 illustrate configuration examples of the light projection unit 222, and both the left and the right of the lower stage of FIG. 3 illustrate configuration examples of the light-receiving unit 223.

Figure 3:
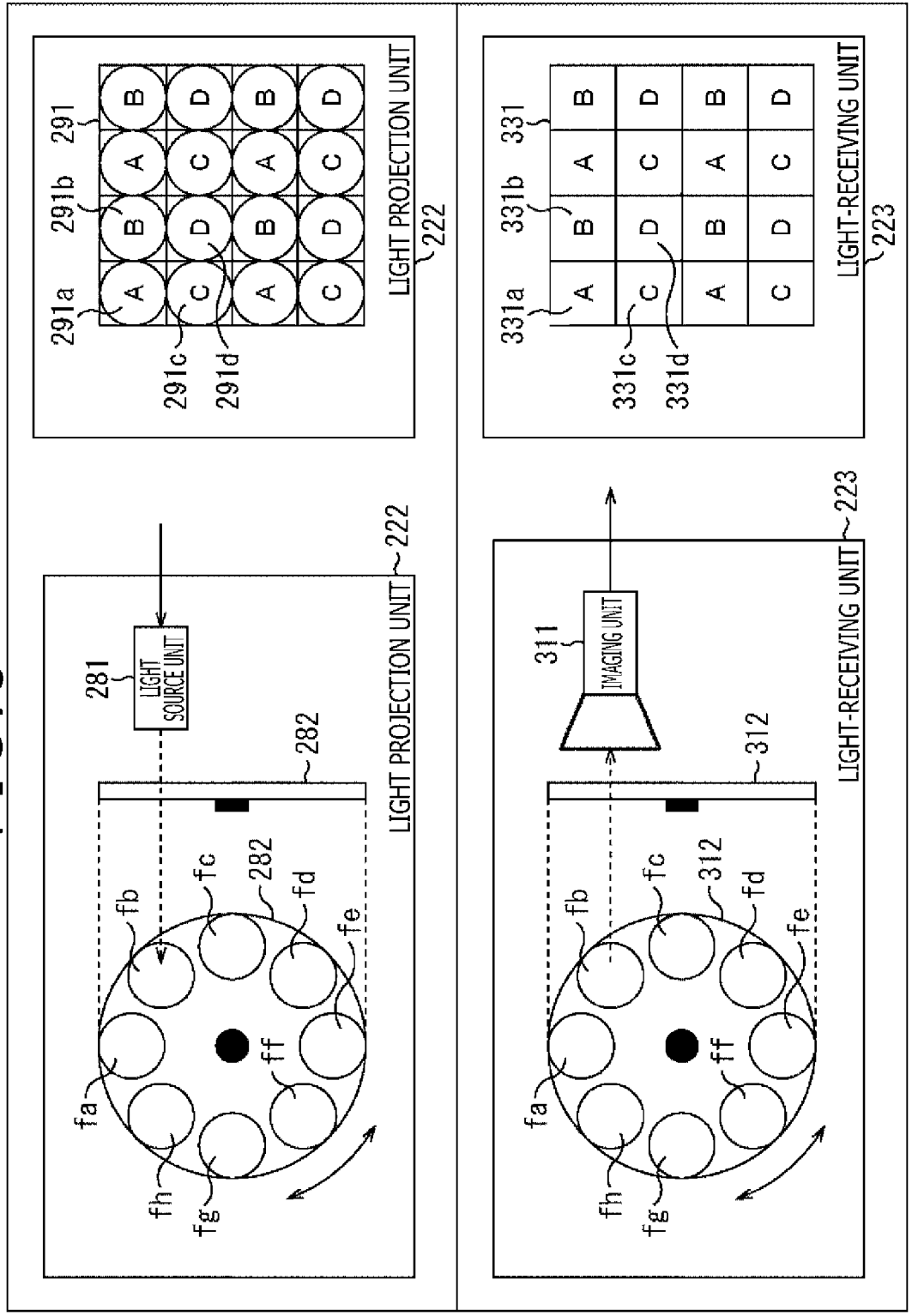
FIG. 3 is a diagram describing a configuration example of a light projection unit and a light-receiving unit of FIG. 2.

The upper left of FIG. 3 illustrates a first configuration example of the light projection unit 222 including a light source unit 281 and a filter wheel 282. Note that in the upper left of FIG. 3, the left part is a front view of the filter wheel 282, and the right part is a side view of the filter wheel 282 and the light source unit 281. The light source unit 281 emits light in a near-infrared band to transmit light in a predetermined wavelength through filters of the filter wheel 282 to project the light to the surroundings in the forward direction or the like of the vehicle 11.

That is, the filter wheel 282 includes eight types of concentric filters fa to fh around the axis of rotation indicated by a black circle as illustrated on the left in the upper left of FIG. 3. The filters fa to fh transmit light at different wavelengths of the light projected by the light source unit 281.

On the basis of the configuration, the light projection adjustment unit 221 rotates the filter wheel 282 about the axis of rotation indicated by the black circle and switches the filters fa to fh at the positions on the front surface of the light source unit 281 to switch the wavelength of the projected light in a range of, for example, 800 to 1000 nm.

Note that eight filters are provided, and the light is switched to eight types of wavelengths in the configuration example illustrated on the upper left of FIG. 3. However, more than eight types or less than eight types of filters may be prepared and switched.

The upper right of FIG. 3 illustrates a second configuration example of the light projection unit 222, and LEDs (Light Emission Diodes) 291 that emit light at different wavelengths in the near-infrared band are arranged in an array. LEDs 291a to 291d distinguished by A to D in FIG. 3 are the LEDs 291 that generate light at different wavelengths. The light projection adjustment unit 221 selects one of the LEDs 291 and causes the LED 291 to emit light at the wavelength of the light to be projected to thereby project the light at the predetermined wavelength in the near-infrared band.

Note that in the configuration of the light projection unit 222 illustrated on the upper right of FIG. 3, the light is projected at four types of wavelengths. However, LEDs with more than four types or less than four types of different wavelengths may be prepared and switched.

The lower left of FIG. 3 illustrates a first configuration example of the light-receiving unit 223 corresponding to the first configuration example of the light projection unit 222 on the upper left of FIG. 3. Note that in the lower left of FIG. 3, the left part is a front view of a filter wheel 312, and the right part is a side view of the filter wheel 312 and an imaging unit 311. The filter wheel 312 is provided with a plurality of concentric filters fa to fh that transmit light at different wavelengths about the axis of rotation indicated by a black circle as illustrated on the left in the lower left of FIG. 3. The imaging unit 311 takes an image of the surroundings, such as in front of the vehicle 11, through one of the filters fa to fh of the filter wheel 312.

On the basis of the configuration, the light projection adjustment unit 221 rotates the filter wheel 312 about the axis of rotation indicated by the black circle to switch the filters fa to fh to thereby control and cause the light projection unit 222 to project light. For example, the light projection adjustment unit 221 switches the filters fa to fh to transmit reflected light at one of the wavelengths in a range of 800 to 1000 nm to allow the imaging unit 311 to receive the light and take an image.

Note that eight filters are provided, and the light is switched to eight types of wavelengths in the configuration example illustrated in the lower left of FIG. 3. However, more than eight types or less than eight types of filters may be prepared and switched.

The lower right of FIG. 3 illustrates a second configuration example of the light-receiving unit 223 corresponding to the second configuration example of the light projection unit 222 on the upper right of FIG. 3, and an imaging element 331 includes light-receiving elements 331a to 331d arranged in an array, in which BPFs (Band Pass Filters) that transmit light at predetermined wavelengths are provided on the front surface.

On the basis of the configuration, the light projection adjustment unit 221 performs control to allow receiving the light by making a switch to one of the light-receiving elements 331a to 331d, in which the BPFs that transmit light at the same wavelength as the light projected by the light projection unit 222 are provided on the front stage.

Note that on the lower right of FIG. 3, the BPFs are provided on the front surface to cause the light-receiving elements 331a to 331d distinguished by A to D in FIG. 3 to transmit light at different wavelengths.

In addition, although the configuration for receiving the light at four types of wavelengths is illustrated in the light-receiving unit 223 on the lower right of FIG. 3, light-receiving elements with more than four types or less than four types of different wavelengths may be prepared and switched.

Furthermore, the light projection unit 222 may be as in the first configuration example on the upper left of FIG. 3, and the light receiving unit 223 may be as in the second configuration example on the lower right of FIG. 3. The light projection unit 222 may be as in the second configuration example on the upper right of FIG. 3, and the light-receiving unit 223 may be as in the first configuration example on the lower left of FIG. 3.

In addition, the light projected by the light projection unit 222 may be light at a wavelength other than the near-infrared light. For example, near-infrared light may be used in a case of making the light invisible for the human beings, and visible light (for example, light from 400 to 800 nm) may be used in a case of sharing the light with a normal headlight at night and the like.

Furthermore, the light projection unit 222 and the light-receiving unit 223 may be shared by an on-board camera provided in the headlight, on the dashboard, or on the upper part of the windshield, for example.

<Principle of Detection by Light Projection Unit and Light-Receiving Unit>

Next, a principle in which the light projected by the light projection unit 222 is reflected by reflectors, and the light is received as reflected light by the light-receiving unit 223 will be described with reference to FIG. 4.

Figure 4:
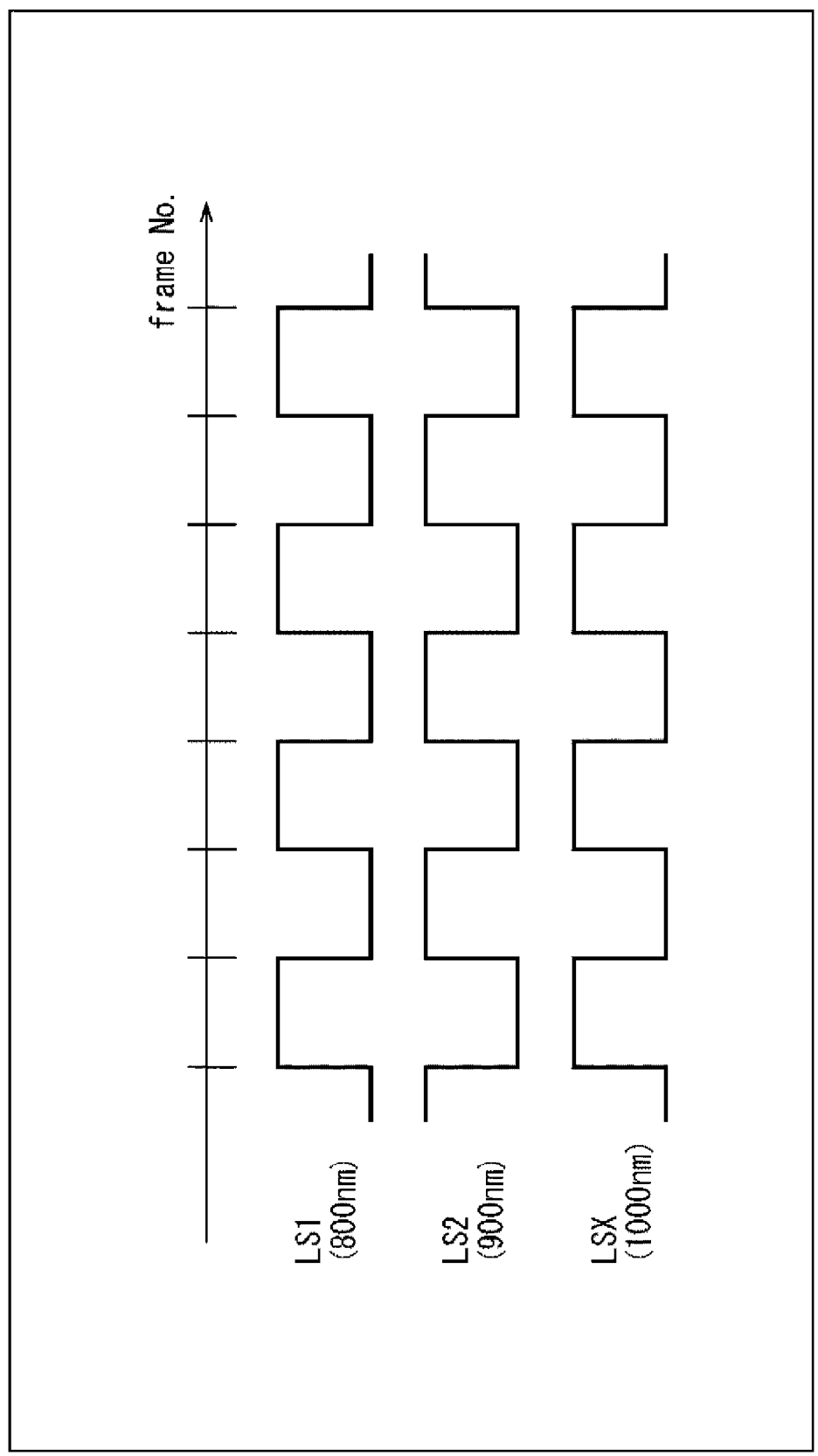
FIG. 4 is a diagram describing timing of light projection by the light projection unit.

For example, as illustrated in the uppermost stage of FIG. 4, the light receiving unit 223 can receive only light LS1 at a wavelength of 800 nm in a case where the light projection unit 222 projects the light LS1 at the wavelength of 800 nm by emitting and extinguishing the light on a frame-by-frame basis, for example. Therefore, the light receiving unit 223 cannot receive light other than the light at the wavelength of 800 nm, such as light LS2 at a wavelength of 900 nm illustrated in the middle stage of FIG. 4 and light LSX at a wavelength of 1000 nm illustrated in the lowermost stage of FIG. 4. This suppresses the generation of interference caused by light at another wavelength, and only the light LS1 at the wavelength of 800 nm reflected by the reflectors can be surely received to surely detect only the light LS1 projected by the light projection 222 as reflected light from the reflectors.

In addition, the light projection unit 222 can project the light LS1 at the wavelength of 800 nm in a first cycle to emit and extinguish the light on a frame-by-frame basis as illustrated in the uppermost stage of FIG. 4, and the light projection unit 222 can project the light LS2 at the wavelength of 900 nm in a second cycle to extinguish and emit the light on a frame-by-frame basis as illustrated in the middle stage of FIG. 4 to thereby reduce misdetection. That is, in the waveform in the uppermost stage and the waveform in the middle stage of FIG. 4, the timing of High (timing of emission) and the timing of Low (timing of extinction) are in completely opposite phases. Therefore, only the light LS1 projected by the light projection unit 222 in a time period of one frame can be surely detected as reflected light from the reflectors.

According to the principle, the light-receiving unit 223 can check the wavelength and the cycle of the received light to receive the light by recognizing that the light is projected from the light projection unit 222 of own car. Even if there is light projected from another car, the interference can be suppressed, and the misdetection can be reduced.

<Extraction of Reflector Regions>

Next, an extraction method of reflector regions will be described with reference to FIG. 5.

Figure 5:
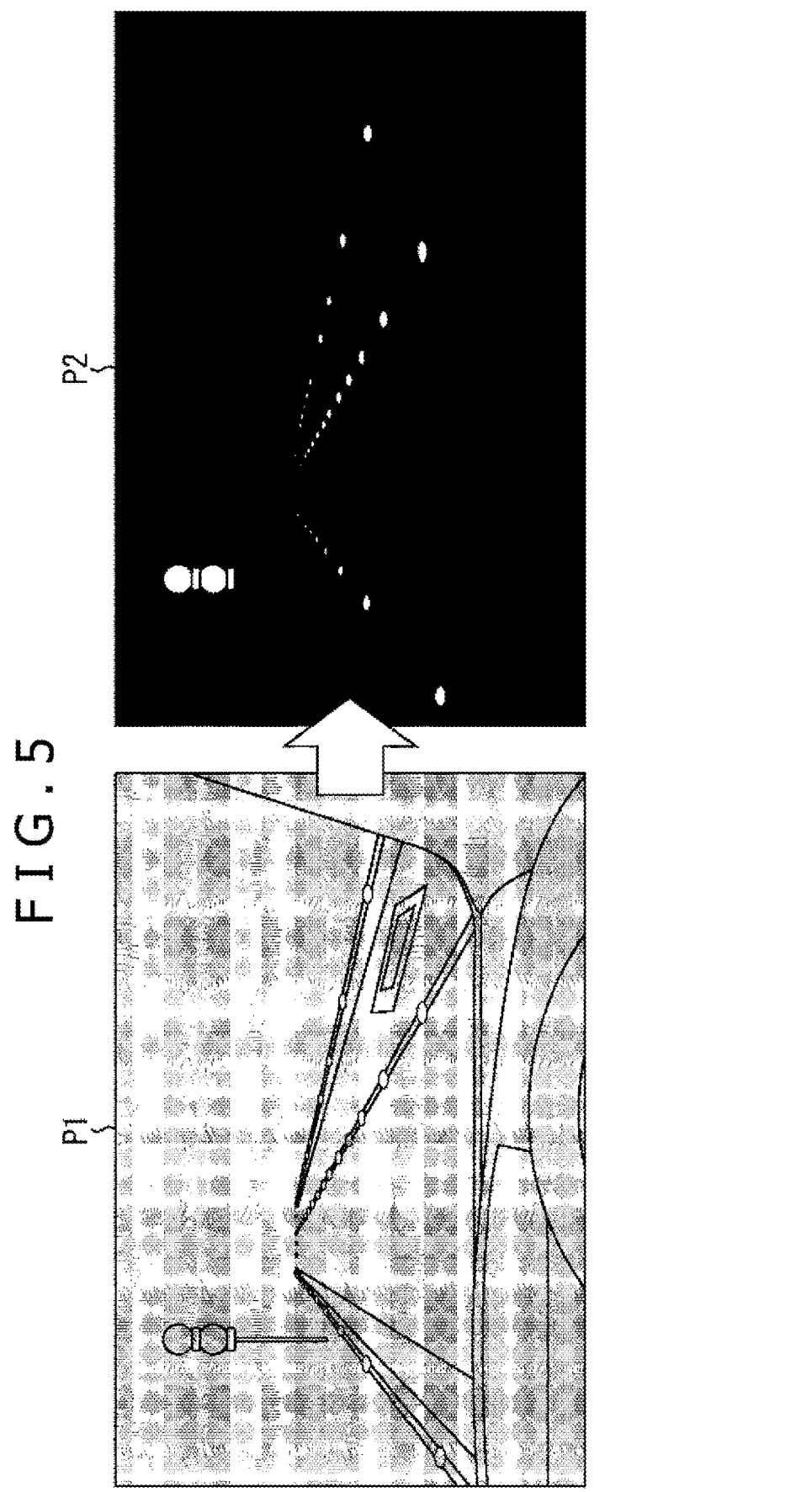
FIG. 5 is a diagram describing a normal image and a reflector image.

The light projection unit 222 projects light at a predetermined wavelength to the road in front of the vehicle 11 as illustrated on the left of FIG. 5 for example, and the light receiving unit 223 takes an image P1. In this case, a difference image of an image taken by the light-receiving unit 223 at the timing that the light is projected and an image taken by the light-receiving unit 223 at the timing that the light is not projected is obtained, and the difference image is further binarized by a predetermined threshold. The image in this case is an image like an image P2 on the right of FIG. 5.

That is, the image P1 is an image at night time, and the image P1 includes a road image, part of the vehicle 11, reflectors on the center line and the side lines, and a sign on the upper left of FIG. 5. On the other hand, the image P2 is an image portraying only reflected light from regions provided with the reflectors. Note that the road sign is also an object with the reflectance higher than a predetermined value, and the sign also reflects, just like the reflectors, the projected light along with the reflectors provided on the road.

That is, the light projection unit 222 and the light-receiving unit 223 described with reference to FIG. 3 can repeat the projection and the extinction of the light at a predetermined cycle, and the difference image of the image during projection and the image during extinction as indicated by the image P2 can be acquired, in which the luminance of only the images of the reflectors, the signs, and the like with a high reflectance is high. Therefore, the reflector region extraction unit 224 extracts, as reflector regions, ranges higher than a predetermined luminance level in the image P2. The reflector region extraction unit 224 further determines that the reflector regions with the area smaller than a predetermined value among the reflector regions obtained in this way are noise and removes the reflector regions. As a result, the reflector region extraction unit 224 can extract the reflector regions from which the noise is removed.

<Extraction of Feature Point (Position of Center of Gravity)>

Next, a method of extracting the position of the center of gravity of the reflector region as a feature point by the feature point extraction unit 225 will be described with reference to FIG. 6.

Figure 6:
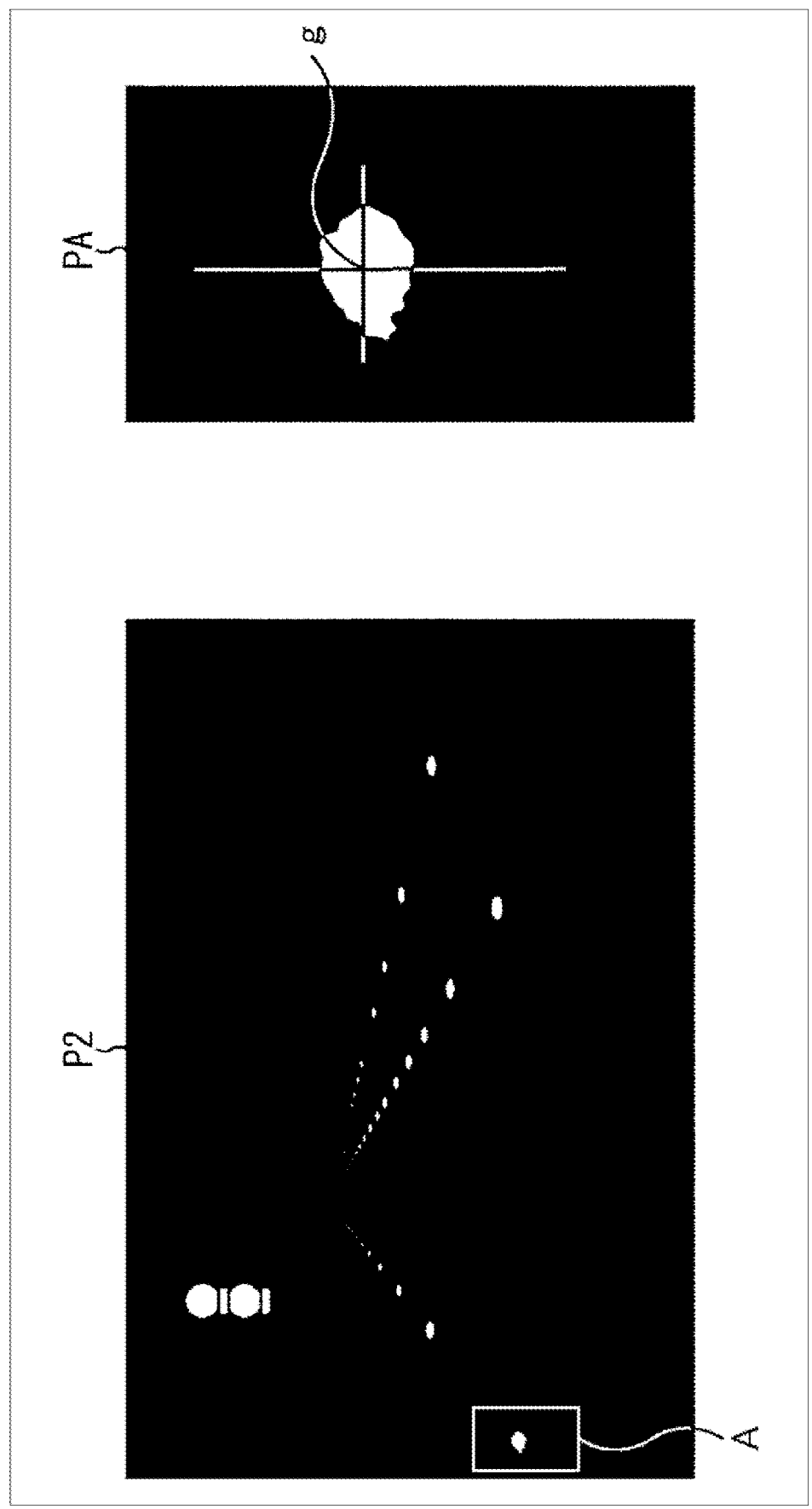
FIG. 6 is a diagram describing a method of obtaining the center of gravity of a reflector region.

For example, in a case of a reflector region A as illustrated on the lower left of the image P2 on the left of FIG. 6 corresponding to the image P2 of FIG. 5, a position of the center of gravity g of the reflector region A in an image PA illustrated on the right of FIG. 6 is obtained as indicated by the following Formula (1).

[Math. 1]
$$a_{p,q} = \sum_x \sum_y x^p y^q I(x, y) \quad (1)$$

Here, $m_{p,q}$ in Formula (1) is expressed by the following Formula (2).

[Math. 2]
$$\text{Center of Gravity } (\bar{x}, \bar{y}) = \left( \frac{m_{1,0}}{m_{0,0}}, \frac{m_{0,1}}{m_{0,0}} \right) \quad (2)$$

That is, the position of the center of gravity of the pixel positions of the pixels of the reflector region A with the luminance greater than a predetermined value is obtained as the position of the center of gravity g of the reflector region.

By obtaining the position of the center of gravity g in this way, the image is taken in a modified state different from the actual shape of the reflector in some cases as can be seen in the reflector region in the image P2. However, there is not much change in the position of the center of gravity, and the positional relationship between the reflectors can be highly accurately reproduced.

Furthermore, the feature point extraction unit 225 assumes that the reflector regions smaller than an area of processing are noise and removes the reflector regions.

<Image Usage Orientation Estimation Result and Reflector Usage Orientation Estimation Result>

Here, an image usage orientation estimation result and a reflector usage orientation estimation result will be described with reference to FIG. 7.

Figure 7:
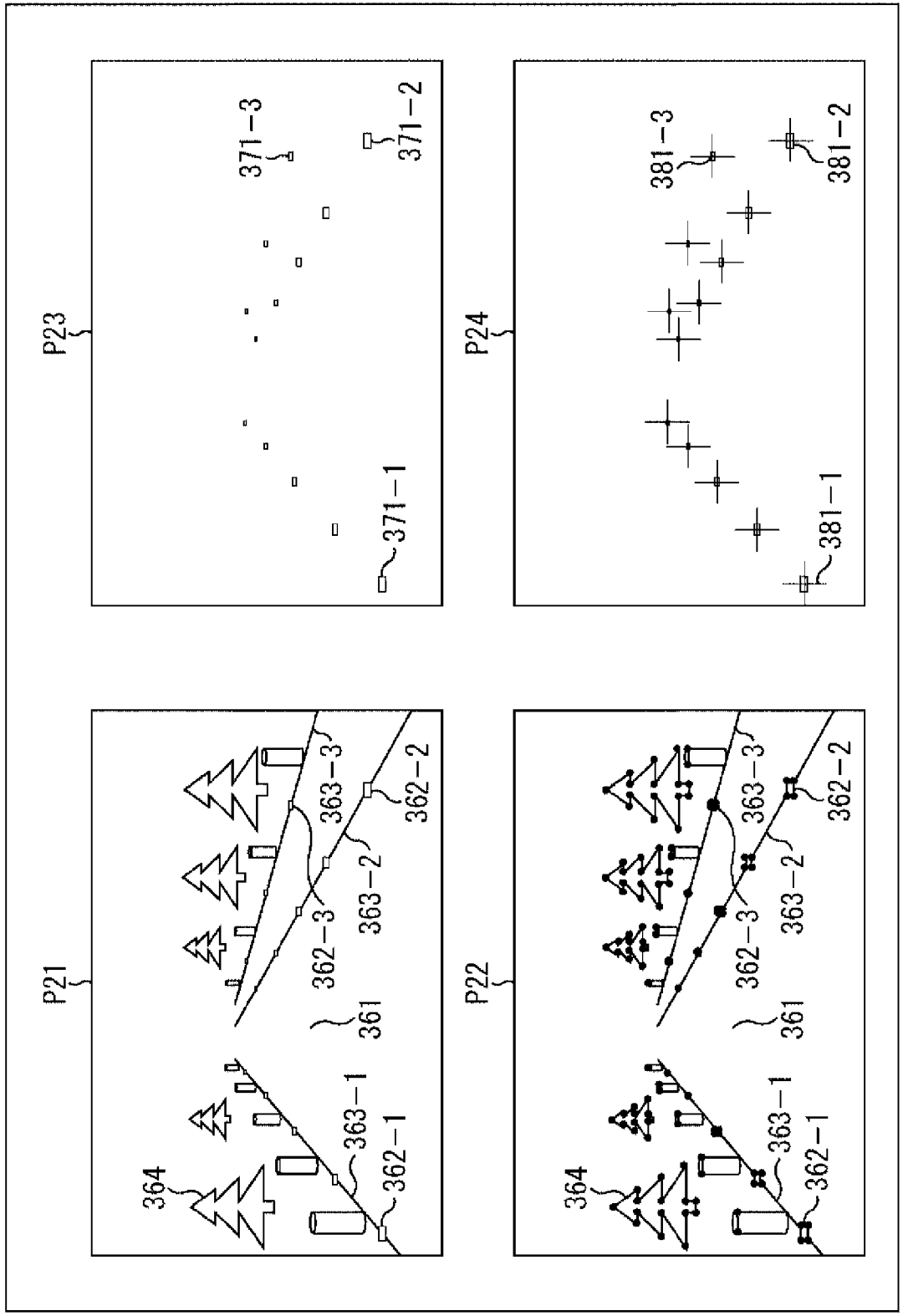
FIG. 7 is a diagram describing a normal image, a feature point image including corner points, an image including extracted reflector regions, and a feature point image including positions of the centers of gravity of the reflector regions.

A case where the image acquisition unit 241 takes an image as indicated by an image P21 on the upper left of FIG. 7 will be considered. In the image P21 on the upper left of FIG. 7, a road 361 is portrayed at the center, and a side line 363-1, a center line 363-2, and a side line 363-3 are portrayed from the left. Reflectors 362-1 to 362-3 are portrayed on the lines from the left, and a tree 364 is portrayed on the side of the road 361.

From the image P21, the feature point extraction unit 242 extracts, for example, feature point information including corner points as indicated in an image P22 on the lower left of FIG. 7. The orientation estimation unit 243 recognizes objects on the basis of the image P22 that is the feature point information including the extracted corner points and estimates an image usage orientation estimation result that is an orientation including the self-position and direction from the arrangement of the recognized objects.

Meanwhile, the reflector region extraction unit 224 extracts reflector regions as indicated by an image P23 on the upper right of FIG. 7. That is, in the image P23 on the upper right of FIG. 7, reflector regions 371-1 to 371-3 are extracted at positions corresponding to the reflectors 362-1 to 362-3 in the image P21.

Note that in the image P21 on the upper left of FIG. 7, although reflectors other than the reflectors 362-1 to 362-3 are also portrayed on the side line 363-1, the center line 363-2, and the side line 363-3, reference signs are not provided. In addition, the reflectors other than the reflectors 362-1 to 362-3 are arranged at substantially equal intervals on individual the side line 363-1, the center line 363-2, and the side line 363-3.

In addition, in the image P23 illustrated on the upper right of FIG. 7, reflector regions other than the reflector regions 371-1 to 371-3 are extracted at positions corresponding to the reflectors not provided with the reference signs of the reflectors 362-1 to 362-3 in the image P21 on the upper left of FIG. 7.

The feature point extraction unit 225 obtains a position of the center of gravity 381 of each reflector region on the basis of the information of the reflector region 371 in the image P23 on the upper right of FIG. 7 and generates, for example, feature point information including feature points indicating the positions of the reflector regions as in an image P24 on the lower right of FIG. 7. Although reference signs are provided to positions of the centers of gravity 381-1 to 381-3 corresponding to the reflector regions 371-1 to 371-3 in the image P24, cross marks are also described for the positions of the centers of gravity not provided with reference signs.

The orientation estimation unit 243 estimates a reflector usage orientation estimation result that is an orientation including the self-position and direction on the basis of the image P24 that is the feature point information including the positions of the centers of gravity of the reflector regions.

In the case of recognizing the objects in the image P21 to estimate the self-position and direction, the objects are recognized on the basis of the feature point information including the corner points illustrated in the images P22, and the self-position and direction are estimated as the image usage orientation estimation result. Incidentally, the orientation can be estimated at a high accuracy in the image usage orientation estimation result because there are a large number of recognizable objects when the surrounding area is a bright place with sufficient brightness in acquiring the image P21. However, the extraction of the corner points that are feature points in the image P21 is difficult in a dark place, and it is difficult to extract the feature points illustrated in the image P22. Therefore, the accuracy of the image usage orientation estimation result in estimating the orientation may be reduced.

On the other hand, in the case of using the image P24 including the feature point information provided with the positions of the centers of gravity of the reflector regions in the image P23 including the reflector regions as feature point information, the obtained reflector usage orientation estimation result can be highly accurately recognized even in a dark place. However, it cannot be stated that the reflector usage orientation estimation result is more accurate than the image usage orientation estimation result in a bright place because, for example, the image P24 does not include as much information as in the image P22 that is the feature point information based on the image P21.

<Integration of Orientation Estimation Results>

Next, an integration method of the reflector usage orientation estimation result, the image usage orientation estimation result, and the GPS IMU usage orientation estimation result executed by the estimation result integration unit 205 will be described.

In the reflector usage orientation estimation result, the image usage orientation estimation result, and the GPS IMU usage orientation estimation result, the accuracy regarding the orientation estimation changes according to the data acquisition situations of the light-receiving unit 223, the image acquisition unit 241, and the GPS IMU data acquisition unit 261.

Therefore, the estimation result integration unit 205 weights the reflector usage orientation estimation result, the image usage orientation estimation result, and the GPS IMU usage orientation estimation result according to the data acquisition situations in the light-receiving unit 223, the image acquisition unit 241, and the GPS IMU data acquisition unit 261 supplied from the data acquisition situation detection unit 204 and uses, for example, a Bayesian filter, an EKF (Extended Kalman Filter), or the like to integrate the results.

Here, an example of a trajectory that is a change in the self-position will be used to describe the integration of the orientation estimation results. For example, in a case considered here, the actual trajectory of the vehicle 11 forms a circle as indicated by a trajectory 401 including a thin line in FIG. 8, and all of the data acquisition situations are favorable. Three types of estimation results, that is, the reflector usage orientation estimation result, the image usage orientation estimation result, and the GPS IMU usage orientation estimation result, are evenly used.

Figure 8:
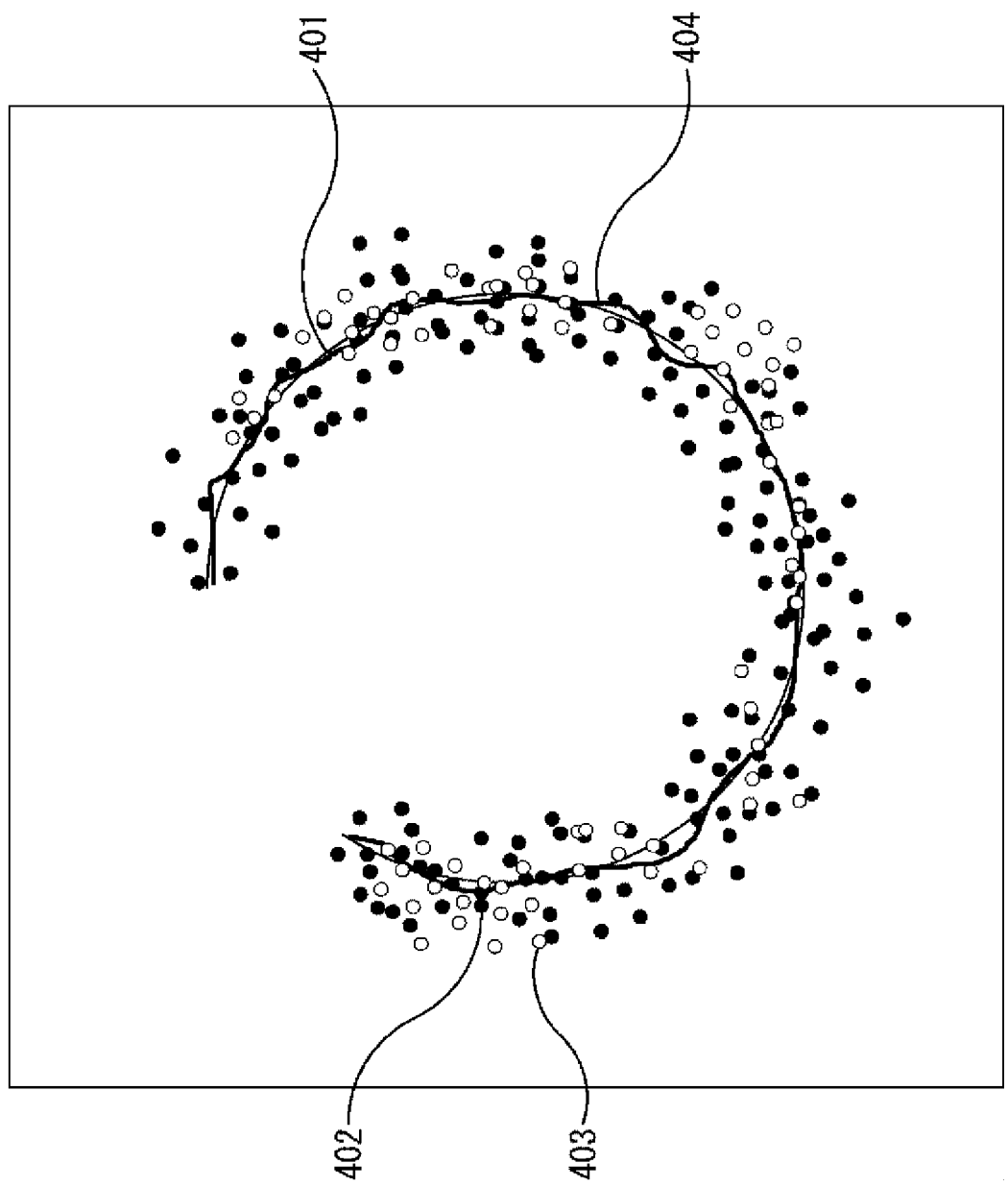
FIG. 8 is a diagram describing integration of estimation results.

In this case, for example, the image usage orientation estimation result and the GPS IMU usage orientation estimation result are indicated by plots 402 of black dots in FIG. 8, and the reflector usage orientation estimation result is expressed by plots 403 of white dots in FIG. 8. The Bayesian filter, the EKF (Extended Kalman Filter), or the like is used to integrate the results of the plots 402 and 403, and the result is indicated by an integrated trajectory 404.

That is, the integrated trajectory 404 obtained by using and integrating the plots 402 of the image usage orientation estimation result and the GPS IMU usage orientation estimation result and the plots 403 of the reflector usage orientation estimation result is estimated as a trajectory close to the actual trajectory 401.

In addition, in a case where information of the illumination of the surroundings can be acquired under the data acquisition situation, the weight of the image usage orientation estimation result may be decreased, or the weight of the reflector usage orientation estimation result may be increased when the stable acquisition of the feature points that are corner points is not possible at a dark time such as at night. As a result, the integrated trajectory 404 is changed to a path close to the plots 403 of the reflector usage orientation estimation result.

Furthermore, in the daytime or the like in which sufficient illumination is secured, the weight of the image usage orientation estimation result using an image with a large amount of information that can be recognized as objects may be increased, or the weight of the reflector usage orientation estimation result may be reduced.

Note that in FIG. 8, each plot is obtained by plotting the self-position estimated on a frame-by-frame basis (period of High or Low in the waveform of FIG. 4).

In addition, although the accuracy of GPS is low in a case where the number of satellites transmitting the GPS data is small, it can be considered that some accuracy is compensated by the data using the result of the position measurement of the IMU.

However, if the time of continuation of the position measurement using only the IMU data is long after a pause of the reception of the GPS data from the GPS satellites, bias errors of IMU may be accumulated depending on the temperature or the degree of vibration, and the accuracy may be reduced.

Therefore, when the state of estimating the orientation by using only the data of IMU is continuing after a pause of data from the satellites of GPS, the weight of the GPS IMU usage orientation estimation result may be reduced according to the temperature or the degree of vibration that affects the bias errors.

Note that in the estimation of the self-position, a reflector of a moving subject, such as a reflector attached to a bicycle, a person, or the like, is likely to adversely affect the estimation of the self-position if the data is cumulatively stored. Therefore, it is desirable to use RANSAC (Random Sample Consensus) or the like to remove the data.

Figure 2:
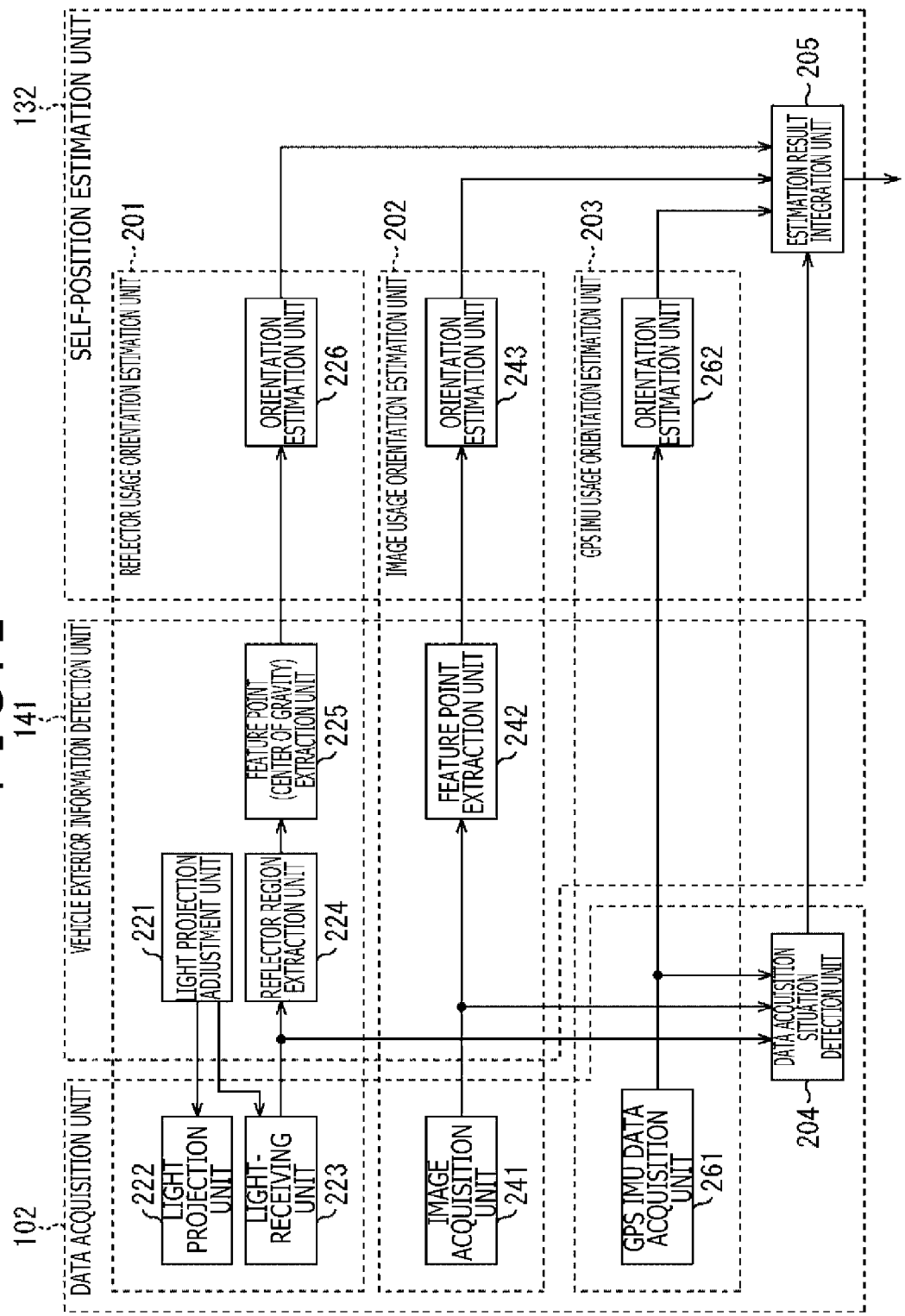
FIG. 2 is a diagram describing a configuration of estimating an orientation in a vehicle control system of FIG. 1.

<Orientation Estimation Process Based on Configuration Example of Estimating Orientation in FIG. 2>

Figure 9:
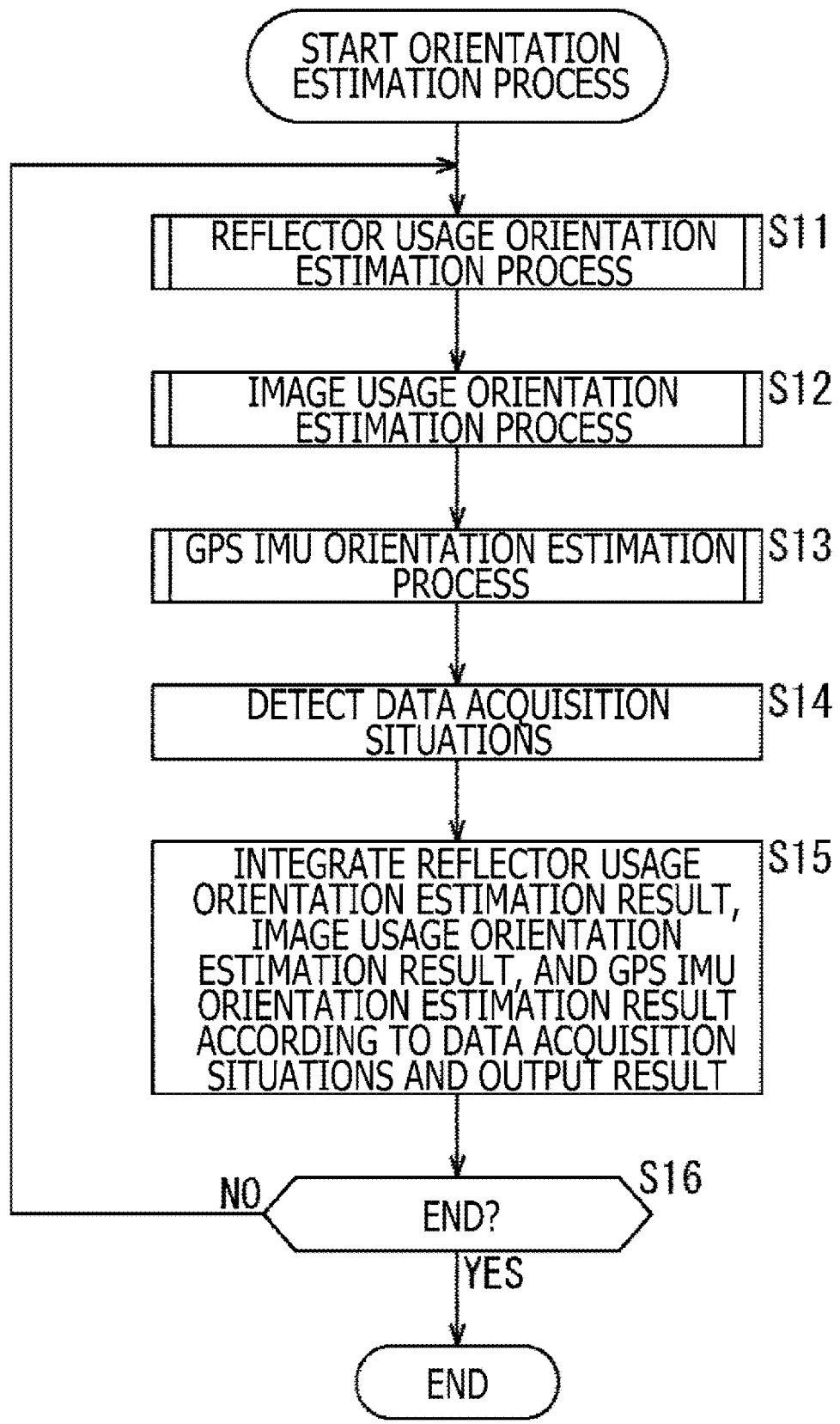
FIG. 9 is a flow chart describing an orientation estimation process.

Next, an orientation estimation process based on the configuration example of estimating the orientation, that is, the self-position and direction, of the vehicle 11 in FIG. 2 will be described with reference to a flow chart of FIG. 9.

In step S11, the reflector usage orientation estimation unit 201 executes a reflector usage orientation estimation process to use the reflectors to estimate the self-orientation and outputs the self-orientation as a reflector usage orientation estimation result to the estimation result integration unit 205. Note that details of the reflector usage orientation estimation process will be described later with reference to a flow chart of FIG. 10.

In step S12, the image usage orientation estimation unit 202 executes an image usage orientation estimation process to use the image to estimate the self-orientation and outputs the self-orientation as an image usage orientation estimation result to the estimation result integration unit 205. Note that details of the image usage orientation estimation process will be described later with reference to a flow chart of FIG. 12.

In step S13, the GPS IMU usage orientation estimation unit 203 executes a GPS IMU usage orientation estimation process to use the data of GPS and IMU to estimate the self-orientation and outputs the self-orientation as a GPS IMU usage orientation estimation result to the estimation result integration unit 205. Note that details of the GPS IMU usage orientation estimation process will be described later with reference to a flow chart of FIG. 13.

In step S14, the data acquisition situation detection unit 204 detects the data acquisition situations of the light-receiving unit 223, the image acquisition unit 241, and the GPS IMU data acquisition unit 261 and supplies the detection results to the estimation result integration unit 205.

That is, the data acquisition situations here include the information of the illumination of the surroundings that affects the detection accuracy of the light-receiving unit 223 and the image acquisition unit 241, the number of satellites capable of acquiring the GPS data that affects the detection accuracy of the GPS IMU data acquisition unit 261, the temperature and the vibration level that affect the bias errors of the IMU data, and the like.

In step S15, the estimation result integration unit 205 weights the reflector usage orientation estimation result, the image usage orientation estimation result, and the GPS IMU usage orientation estimation result according to the data acquisition situations, uses the Bayesian filter, the EKF (Extended Kalman Filter), or the like to integrate the results, and outputs the integrated result as an orientation estimation result as described with reference to FIG. 8.

In step S16, whether the input unit 101 is operated, and the end is instructed by the user is determined. If the end is not instructed, the process returns to step S11, and the subsequent process is repeated. That is, the process of steps S11 to S16 is repeated until the end is instructed. Then, if it is assumed that the end is instructed in step S16, the process ends.

According to the process, individual of the reflector usage orientation estimation result, the image usage orientation estimation result, and the GPS IMU usage orientation estimation result is obtained, and the results are weighted and integrated according to the data acquisition situations that affect the accuracy of each result. The integrated result is output as an orientation estimation result. As a result, the orientation estimation results obtained by three types of estimation methods are integrated after weighting the results according to the data acquisition situations, and the orientation is estimated. Therefore, highly accurate orientation estimation can be realized.

<Reflector Usage Orientation Estimation Process>

Figure 10:
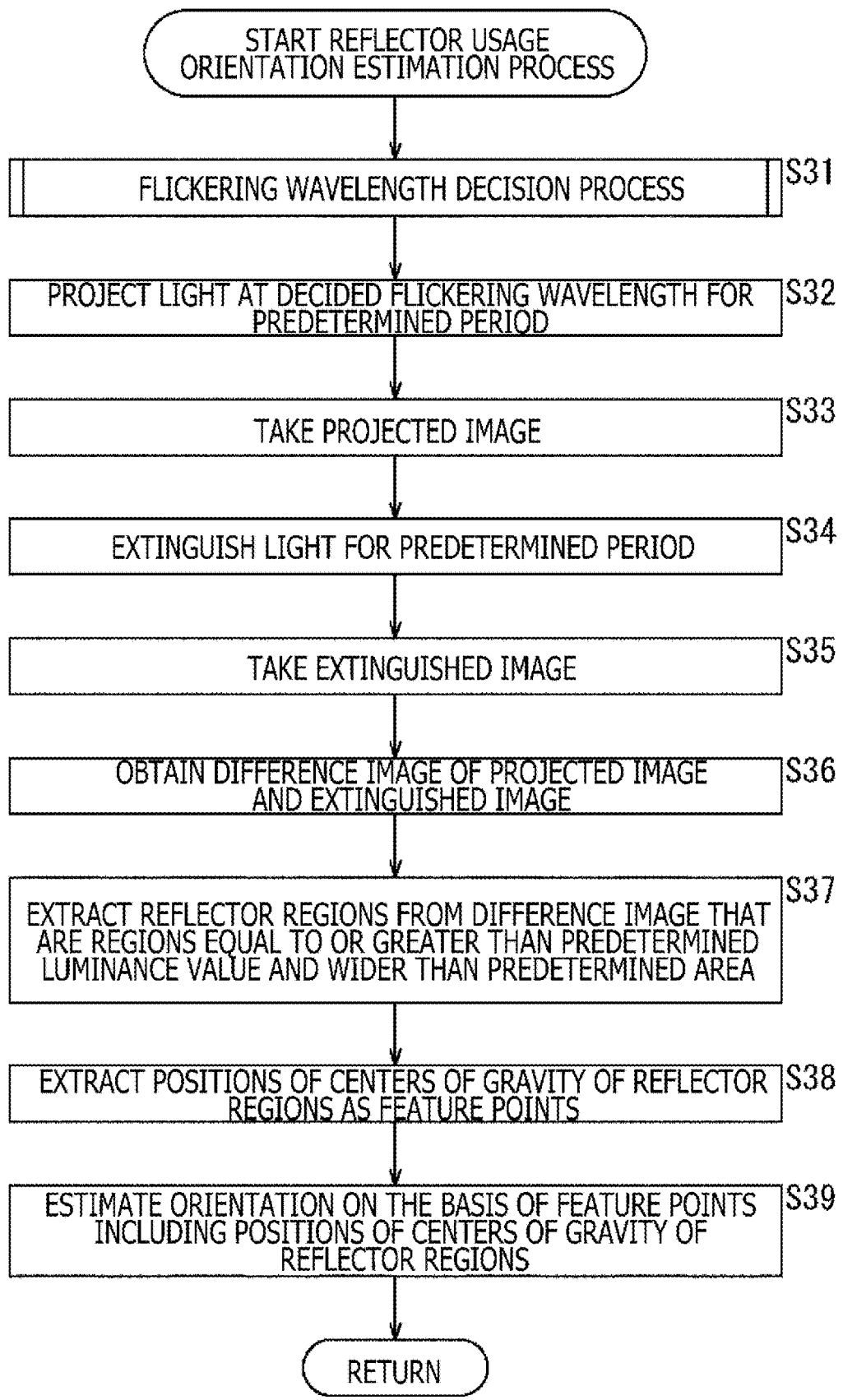
FIG. 10 is a flow chart describing a reflector usage orientation estimation process.

Next, the reflector usage orientation estimation process executed by the reflector usage orientation estimation unit 201 of FIG. 2 will be described with reference to the flow chart of FIG. 10.

In step S31, the light projection adjustment unit 221 executes a flickering wavelength decision process to decide the wavelength of the light to be flickered (emission and extinction are alternately repeated) and projected by the light projection unit 222. Note that details of the flickering wavelength decision process will be described later with reference to a flow chart of FIG. 11.

In step S32, the light projection adjustment unit 221 causes the light projection unit 222 to emit light for a predetermined period, for example, one frame, at the flickering wavelength decided in the process of step S31. More specifically, in the case where the light projection unit 222 has, for example, the configuration on the upper left of FIG. 3, the light projection adjustment unit 221 rotates the filter wheel 282 as necessary to set the filter that transmits the light at the decided wavelength among the filters fa to fh to transmit the light from the light source unit 281 and causes the light source unit 281 to emit the light.

In addition, in the case where the light projection unit 222 has the configuration on the upper right of FIG. 3, the light projection adjustment unit 221 specifies the LED 291 that emits light at the decided flickering wavelength among the LEDs 291a to 291d and causes the LED 291 to emit the light.

In step S33, the light projection adjustment unit 221 adjusts the light-receiving unit 223 into a state that allows taking an image including the light at the decided flickering wavelength. The light projection adjustment unit 221 controls the light-receiving unit 223 at the timing that the light projection unit 222 is projecting light and causes the light-receiving unit 223 to receive the light for a predetermined time period, take an image according to the received light, and output the image to the reflector region extraction unit 224. Note that hereinafter, the image taken during the light projection by the light projection unit 222 will be referred to as a projected image.

More specifically, in the case where the light-receiving unit 223 has the configuration on the lower left of FIG. 3, the light projection adjustment unit 221 rotates the filter wheel 312 to set, at the position of the front stage of the imaging unit 311, the filter for transmitting the light at the wavelength decided as a wavelength of the light to be projected by the light projection unit 222 among the filters fa to fh and controls the imaging unit 311 to take an image for a predetermined time period at the timing that the light projection unit 222 is projecting the light.

In addition, in the case where the light-receiving unit 223 has the configuration on the lower right of FIG. 3, the light projection adjustment unit 221 specifies the light-receiving element including the BPF that transmits the light at the decided flickering wavelength among the light-receiving elements 331*a* to 331*d* and causes the light-receiving element to receive the light.

In step S34, the light projection adjustment unit 221 causes the light projection unit 222 to extinguish the light for a predetermined period, such as one frame.

In step S35, the light projection adjustment unit 221 controls the light-receiving unit 223 to take an image at the timing of the extinction by the light projection unit 222 and output the image to the reflector region extraction unit 224. Note that hereinafter, the image taken during the extinction by the light projection unit 222 will be referred to as an extinguished image.

In step S36, the reflector region extraction unit 224 obtains differences between the pixels at the same positions in the projected image and the extinguished image and obtains a difference image including the obtained difference values between the pixels.

In step S37, the reflector region extraction unit 224 extracts reflector region candidates that are pixels higher than a predetermined luminance value in the difference image.

In step S38, for each of the pixels as reflector region candidates, the reflector region extraction unit 224 obtains the number of pixels as reflector region candidates among the adjacent pixels. The reflector region extraction unit 224 assumes that the pixels with fewer than a predetermined number of reflector region candidates are some kind of noise instead of reflector candidates and removes the pixels from the reflector region candidates. After executing a similar process for all of the pixels as reflector region candidates, the reflector region extraction unit 224 assumes that the remaining reflector region candidates are reflector regions and outputs information of the obtained reflector regions to the feature point extraction unit 225. That is, as a result of the process, the individual reflector regions are regions equal to or greater than a predetermined luminance and larger than a predetermined area in the difference image.

In step S39, the feature point extraction unit 225 extracts feature points including the positions of the centers of gravity of the reflector regions from the information of the reflector regions and outputs the feature points as feature point information to the orientation estimation unit 226.

In step S40, the orientation estimation unit 226 uses, for example, SLAM or the like to estimate the self-orientation on the basis of the feature point information including the positions of the centers of gravity of the reflector regions and outputs the estimation result as a reflector usage orientation estimation result to the estimation result integration unit 205.

According to the process, the surrounding reflectors can be used to estimate the orientation including the self-position and direction of the vehicle 11. The reflectors can be highly accurately detected even at night, and the orientation including the self-position and direction can be highly accurately estimated particularly when it is dark.

Note that although the orientation estimation process using the reflectors is described above, objects other than the reflectors may be used as long as the projected light can be reflected at a reflectance higher than a predetermined reflectance, and for example, mirrors, road signs, or lines on the road (such as white lines and yellow lines) may be used. Particularly, mirrors, road signs, lines on the road (such as white lines and yellow lines), and the like including a retroreflective material reflect light at a higher reflectance. In addition, the wavelength of the projected light may also be other wavelengths. For example, near-infrared light may be used to make the light invisible for human beings, and visible light may be used in a case where the normal headlight and the light projection unit 222 are shared at night or the like.

<Flickering Wavelength Decision Process>

Figure 11:
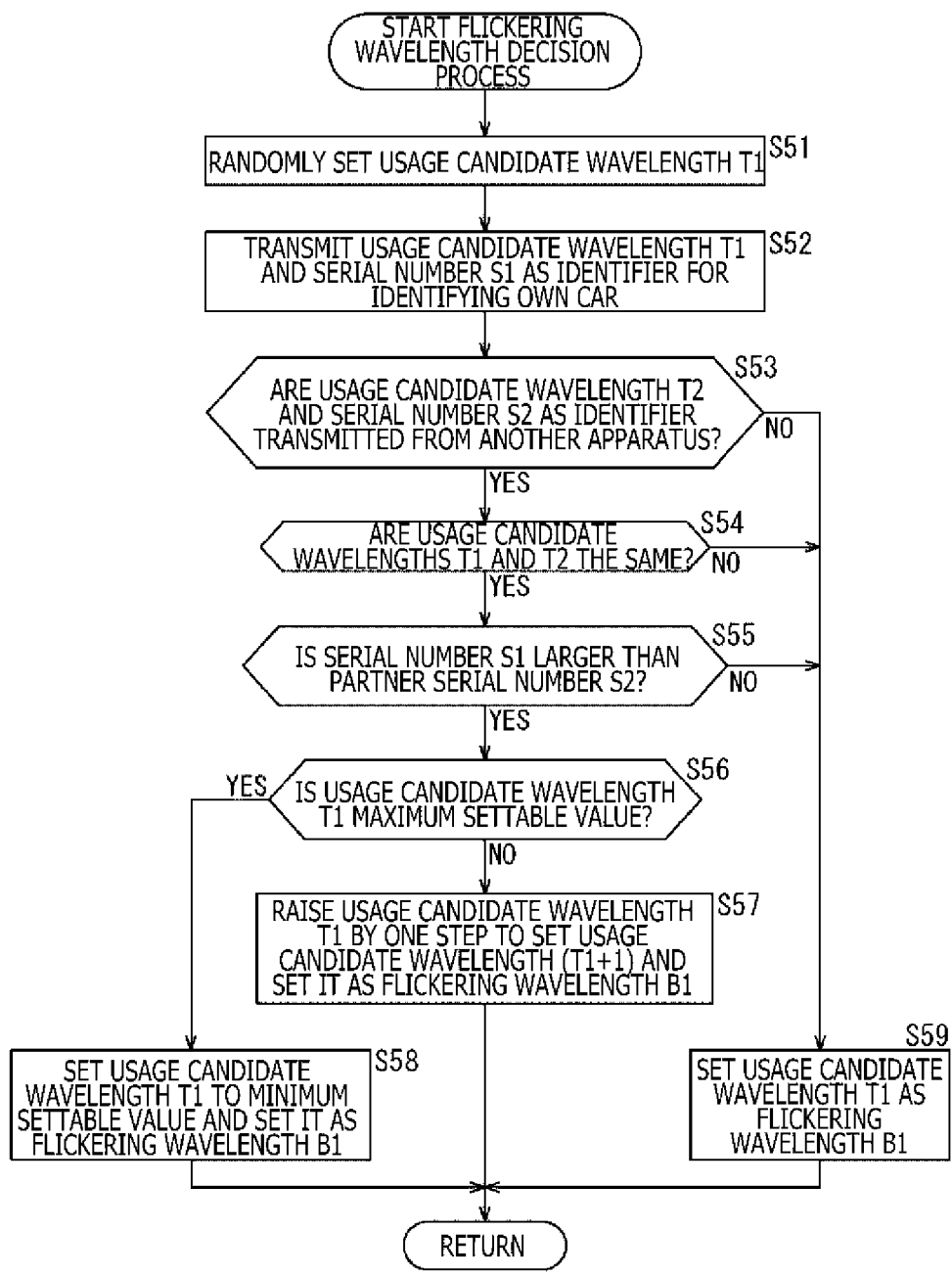
FIG. 11 is a flow chart describing a flickering wavelength decision process.

Next, the flickering wavelength decision process will be described with reference to the flow chart of FIG. 11.

In step S51, the light projection adjustment unit 221 randomly sets a usage candidate wavelength T1.

In step S52, the light projection adjustment unit 221 uses a signal in a predetermined frequency band of radio or the like to transmit the usage candidate wavelength T1 and a serial number S1 identifying the own car to the surrounding area.

In step S53, the light projection adjustment unit 221 determines whether a usage candidate wavelength T2 and a serial number S2 as an identifier are transmitted from the light projection adjustment unit 221 of another car. That is, in a case where there is another car nearby having the configuration described with reference to FIG. 2, the usage candidate wavelength T2 and the serial number S2 are transmitted as in the own car. Therefore, whether there is the transmission is checked.

In step S53, if, for example, the usage candidate wavelength T2 and the serial number S2 as an identifier are transmitted from the light projection adjustment unit 221 of another car, the process proceeds to step S54.

In step S54, the light projection adjustment unit 221 determines whether the own usage candidate wavelength T1 and the usage candidate wavelength T2 transmitted from another car are the same. If the own usage candidate wavelength T1 and the usage candidate wavelength T2 transmitted from another car are the same in step S54, it is assumed that there is a possibility of misjudgment due to interference in the reflector usage orientation estimation process, and the process proceeds to step S55.

In step S55, the light projection adjustment unit 221 determines whether the own serial number S1 is larger than the serial number S2 transmitted from another car. If the own serial number S1 is larger than the serial number S2 transmitted from another car in step S55, the process proceeds to step S56.

In step S56, the light projection adjustment unit 221 determines whether the own usage candidate wavelength T1 is a maximum settable wavelength. If the own usage candidate wavelength T1 is not the maximum settable wavelength in step S56, the process proceeds to step S57.

In step S57, the light projection adjustment unit 221 raises the usage candidate wavelength T1 by one step and sets the usage candidate wavelength (T1+1) as a flickering wavelength B1. That is, the usable wavelengths are sequentially numbered according to the wavelengths from the minimum wavelength to the maximum wavelength, and if the usage candidate wavelength is not the maximum wavelength, the wavelength one step longer, that is, the usage candidate wavelength (T1+1) one level above the randomly set usage candidate wavelength T1 in the order according to the wavelengths, is set as the flickering wavelength.

On the other hand, if the own usage candidate wavelength T1 is the maximum settable wavelength in step S56, the process proceeds to step S58.

In step S58, the light projection adjustment unit 221 sets a minimum available value of the usage candidate wavelength T1 as the flickering wavelength B1. That is, in the case of the maximum wavelength, the wavelength one step longer, that is, the usage candidate wavelength one level above in the order according to the wavelengths, cannot be set, and the flickering wavelength is set to the minimum wavelength.

Furthermore, if the usage candidate wavelength T2 and the serial umber S2 are not transmitted from another car in step S53, it is assumed that there is no car in the surrounding area that may cause interference, and the process proceeds to step S59.

In step S59, the light projection adjustment unit 221 sets the randomly set usage candidate wavelength T1 as the flickering wavelength B1 without change.

In addition, if the usage candidate wavelengths T1 and T2 are not the same in step S54, it is assumed that interference is not generated, and the process also proceeds to step S59. Furthermore, in the case where the serial number S1 is not larger than the serial number S2 in step S55, there is a possibility of interference, but the serial number of the other car is larger than the own serial number. Therefore, the other car changes the wavelength, and it is assumed that the own wavelength does not have to be changed. The process proceeds to step S59.

That is, if the own usage candidate wavelength T1 and the usage candidate wavelength T2 transmitted from another car are the same in step S54, misjudgment may occur due to interference in the reflector usage orientation estimation process. Therefore, the process proceeds to step S55.

Then, in step S55, whether the serial number S1 is larger than the serial number S2 is determined, and which one of the own car and the other car will change the usage candidate wavelength is determined. Although the case in which the car with the larger serial number changes the usage candidate wavelength is described in the example, the car with the smaller serial number may change the usage candidate wavelength, or which car will change the usage candidate wavelength may be determined under other conditions.

Furthermore, if none of the conditions of steps S53 to S55 is met, the randomly set usage candidate wavelength T1 is set as the flickering wavelength B1 without change.

Then, whether the usage candidate wavelength T1 is the maximum available wavelength is determined in step S56, and if the usage candidate wavelength T1 is not the maximum value, the usage candidate wavelength (T1+1) obtained by raising the usage candidate wavelength T1 by one step is set as the flickering wavelength B1 in step S57. That is, the usable wavelengths of the usage candidate wavelengths are lined up and numbered as settable wavelengths in ascending order from the minimum value. The usage candidate wavelength T1 is changed to the usage candidate wavelength (T1+1) with a wavelength one step longer (with a number larger by one), and the usage candidate wavelength (T1+1) is set as the flickering wavelength B1.

Furthermore, if the usage candidate wavelength T1 is the maximum available wavelength in step S56, the minimum available value of the usage candidate wavelength T1 is set as the flickering wavelength B1 in step S58. That is, the usage candidate wavelength T1 cannot be changed and raised by one step, and the minimum value of the usage candidate wavelength is set as the flickering wavelength.

As a result of the process, the light projection unit 222 of another car around the own car does not project light at the same wavelength as the light projected by the light projection unit 222 of the own car, and this can suppress misjudgment caused by interference due to the light projected by the light projection unit 222 of another car.

As a result, misdetection caused by the light at the same wavelength projected by another car can be suppressed in the reflector usage orientation estimation process, and the accuracy of the reflector usage orientation estimation result can be improved.

<Image Usage Orientation Estimation Process>

Figure 12:
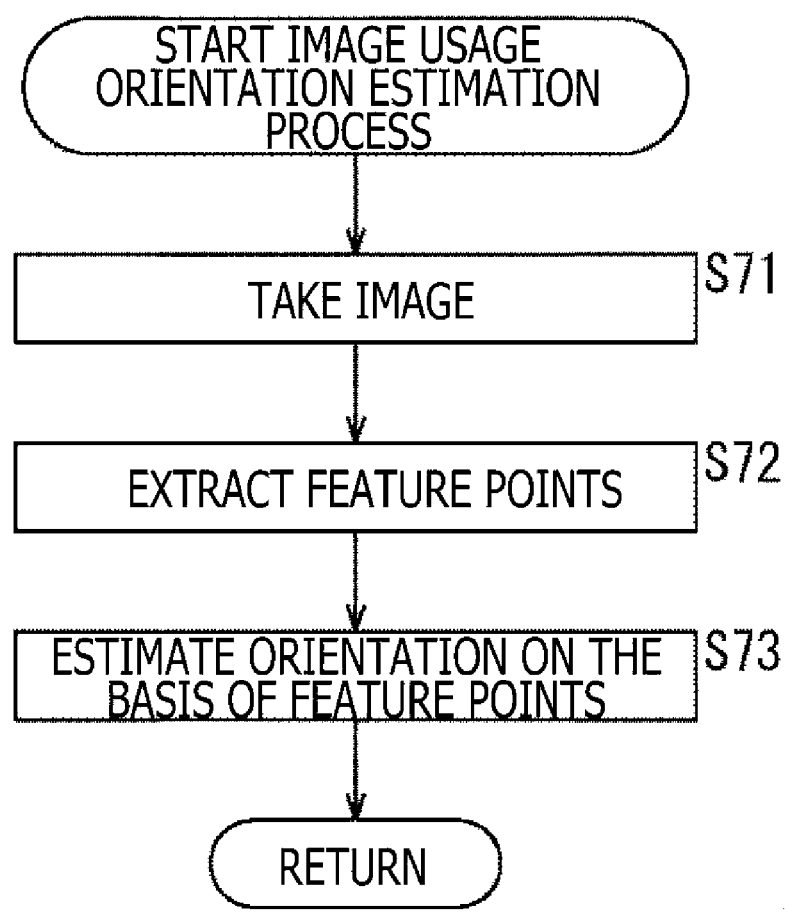
FIG. 12 is a flow chart describing an image usage orientation estimation process.

Next, the image usage orientation estimation process executed by the image usage orientation estimation unit 202 will be described with reference to the flow chart of FIG. 12.

In step S71, the image acquisition unit 241 takes an image of the surroundings of the vehicle 11 and outputs the taken image to the feature point extraction unit 242.

In step S72, the feature point extraction unit 242 extracts, for example, corner points as feature points in the taken image and outputs the feature points as feature point information to the orientation estimation unit 243.

In step S73, the orientation estimation unit 243 uses, for example, SLAM or the like to estimate the self-orientation on the basis of the information of the feature points supplied from the feature point extraction unit 242 and outputs the self-orientation as an image usage orientation estimation result to the estimation result integration unit 205.

According to the process, the self-orientation can be estimated on the basis of the image. As a result, the self-orientation is estimated on the basis of identification information of a large number of objects included in an image in a bright environment, such as in the daytime with high illumination, and the estimation accuracy can be improved.

<GPS IMU Usage Orientation Estimation Process>

Figure 13:
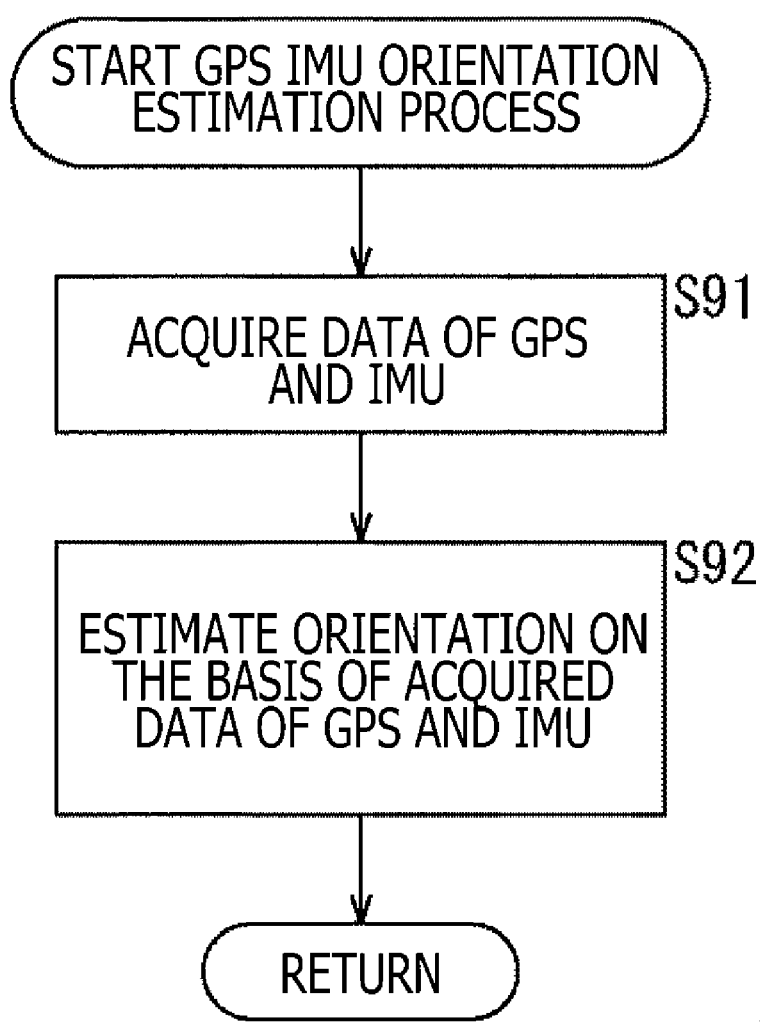
FIG. 13 is a flow chart describing a GPS IMU usage orientation estimation process.

Next, the GPS IMU usage orientation estimation process executed by the GPS IMU usage orientation estimation unit 203 will be described with reference to the flow chart of FIG. 13.

In step S91, the GPS IMU data acquisition unit 261 acquires the GPS data from the satellite of GPS and the IMU data acquired by the inertial measurement apparatus, such as a gyroscope, and outputs the data to the orientation estimation unit 262.

In step S92, the orientation estimation unit 262 estimates the self-orientation on the basis of the GPS data from the satellite of GPS and on the basis of the IMU data acquired by the IMU including the inertial measurement apparatus such as a gyroscope.

According to the process, the orientation is basically estimated on the basis of the GPS data from the GPS satellite, and the orientation is estimated on the basis of the IMU data in an environment in which the GPS data from the GPS satellite cannot be acquired. Obviously, the orientation estimated based on the satellite data of GPS and the orientation estimated based on the data of IMU may always be combined to estimate the orientation.

2. Modification

Although the reflector usage orientation estimation unit 201 includes one light projection unit 222 and one light-receiving unit 223 in the example described above, a plurality of light projection units 222 and light-receiving units 223 may be provided. The units may project light at different wavelengths, and the timing of the light projection and the light reception may be shifted.

That is, for example, three sets of light projection units 222 and light-receiving units 223 are installed to provide light sources with three types of wavelengths including light LS11 at a wavelength of 800 nm, light LS12 at a wavelength of 810 nm, and light LS13 at a wavelength of 820 nm and to provide three types of corresponding light-receiving units 223. In this case, as illustrated for example in FIG. 14, the light can be projected by shifting the timing of the light projection by time intervals d. In this way, the light LS11 at the wavelength of 800 nm, the light LS12 at the wavelength of 810 nm, and the light LS13 at the wavelength of 820 nm can be sequentially shifted by the time intervals d, and the light at each wavelength can be projected and received. As a result, the reflected light from the reflectors can be identified and received. Here, the time intervals d can be adjusted to identify and detect the reflected light from the reflectors as reflected light of the light projected by own car even in a time period shorter than one frame, without changing the frame rate of the imaging unit 311 in the light-receiving unit 223. That is, in the case of FIG. 14, the reflection of the light projected by own car reflected by the reflectors can be recognized to receive the light at a time period 2d shorter than the time period of one frame.

Figure 14:
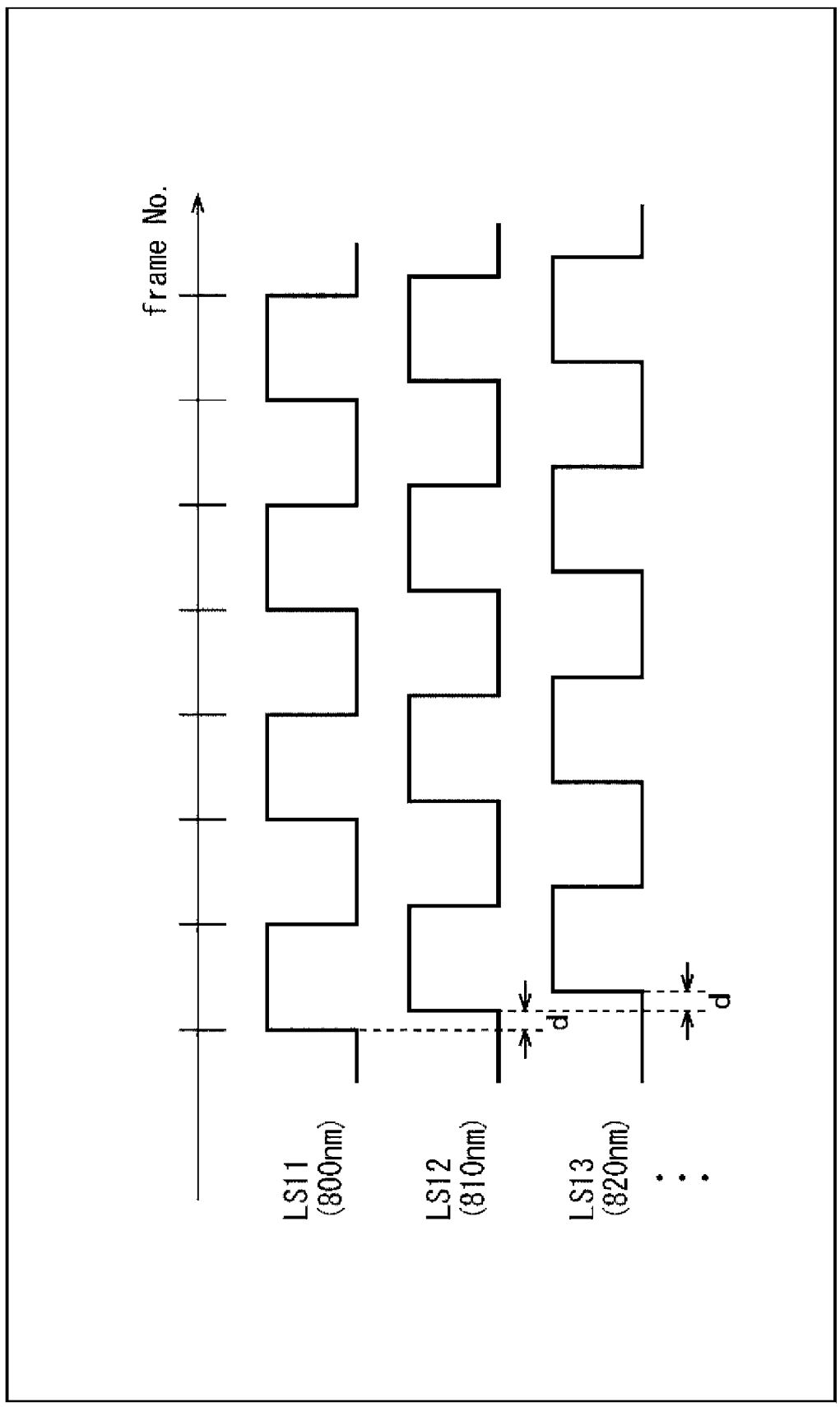
FIG. 14 is a diagram describing an action of a modification.

As a result, the reflector usage orientation estimation process can be realized at a higher speed. Note that FIG. 14 is a waveform chart illustrating timing of light emission and extinction of individually the light LS11 at 800 nm, the light LS12 at 810 nm, and the light LS13 at 820 nm from above.

3. Example of Execution by Software

Incidentally, although the series of processes can be executed by hardware, the series of processes can also be executed by software. In the case where the series of processes are executed by software, a program included in the software is installed from a recording medium to a computer incorporated into dedicated hardware or to, for example, a general-purpose personal computer or the like that can execute various functions by installing various programs.

Figure 15:
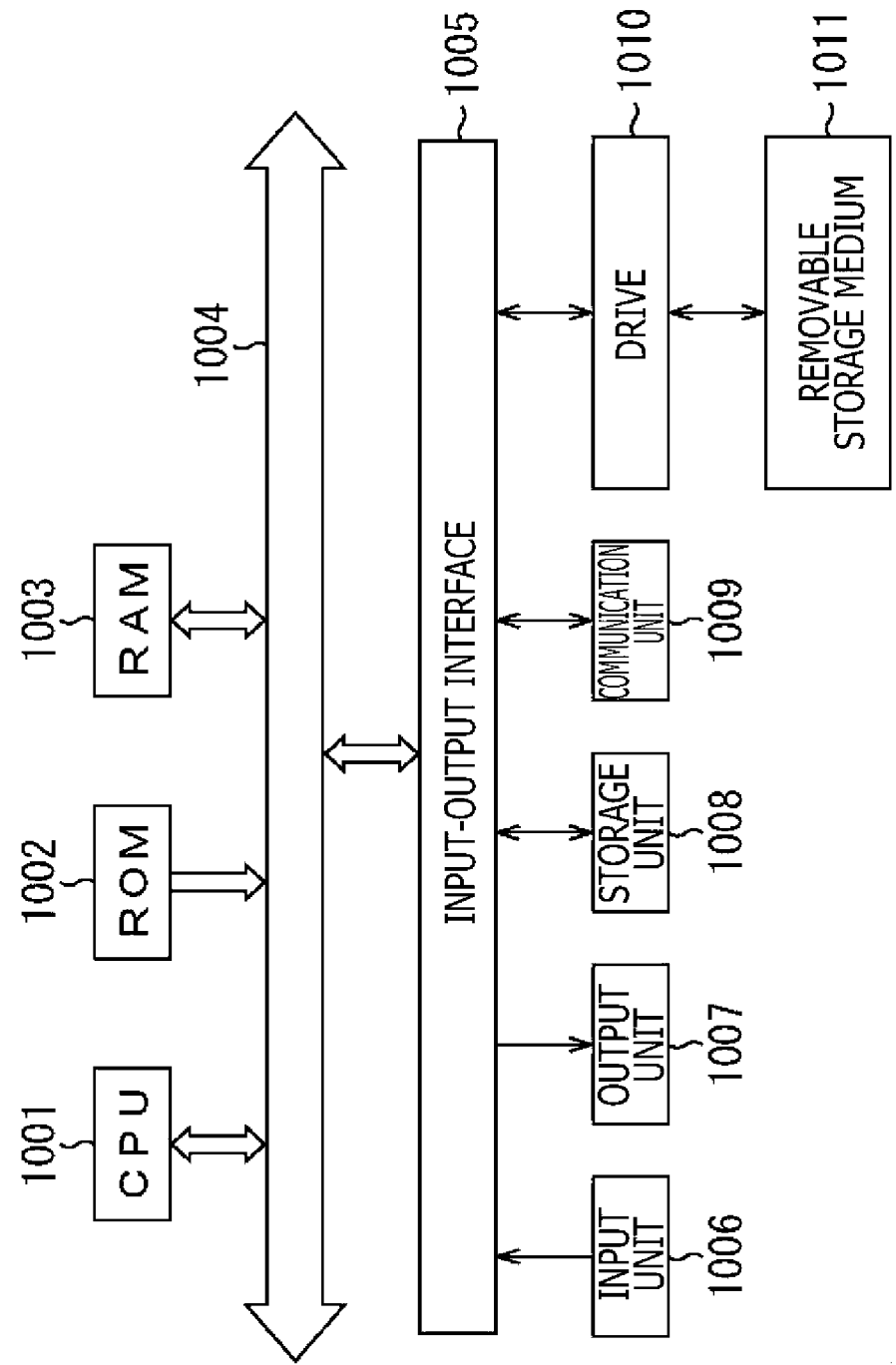
FIG. 15 is a diagram describing a configuration example of a general-purpose computer.

FIG. 15 illustrates a configuration example of the general-purpose computer. The computer includes a CPU (Central Processing Unit) 1001. An input-output interface 1005 is connected to the CPU 1001 through a bus 1004. A ROM (Read Only Memory) 1002 and a RAM (Random Access Memory) 1003 are connected to the bus 1004.

Components connected to the input-output interface 1005 include: an input unit 1006 including input devices, such as a keyboard and a mouse, for the user to input an operation command; an output unit 1007 that outputs a process operation screen or an image of a processing result to a display device; a storage unit 1008 including a hard disk drive or the like that stores programs and various data; and a communication unit 1009 including a LAN (Local Area Network) adapter or the like and configured to execute a communication process through a network represented by the Internet. A drive 1010 that reads and writes data to a removable medium 1011, such as a magnetic disk (including a flexible disk), an optical disk (including a CD-ROM (Compact Disc-Read Only Memory) and a DVD (Digital Versatile Disc)), and a semiconductor memory, is also connected to the input-output interface 1005.

The CPU 1001 executes various processes according to the programs stored in the ROM 1002 or according to programs read from the removable medium 1011, such as a magnetic disk, an optical disk, a magneto-optical disk, and a semiconductor memory, installed on the storage unit 1008, and loaded from the storage unit 1008 to the RAM 1003. Data and the like necessary for the CPU 1001 to execute various processes are also appropriately stored in the RAM 1003.

In the computer configured in this way, the CPU 1001 loads, for example, a program stored in the storage unit 1008 to the RAM 1003 through the input-output interface 1005 and the bus 1004 to execute the program to thereby execute the series of processes.

The program executed by the computer (CPU 1001) can be provided by, for example, recording the program in the removable medium 1011 as a package medium or the like. The program can also be provided through a wired or wireless transmission medium, such as a local area network, the Internet, and digital satellite broadcasting.

In the computer, the removable medium 1011 can be mounted on the drive 1010 to install the program on the storage unit 1008 through the input-output interface 1005. The program can also be received by the communication unit 1009 through a wired or wireless transmission medium and installed on the storage unit 1008. Furthermore, the program can be installed in advance in the ROM 1002 or the storage unit 1008.

Note that the program executed by the computer may be a program for executing the processes in chronological order described in the present specification or may be a program for executing the processes in parallel or at a necessary timing such as when the program is invoked.

Note that the CPU 1001 in FIG. 15 realizes the functions of the automatic drive control unit 112 in FIG. 1. In addition, the storage unit 1008 in FIG. 15 realizes the storage unit 111 in FIG. 1.

In addition, the system in the present specification denotes a set of a plurality of constituent elements (apparatuses, modules (components), and the like), and whether all of the constituent elements are in the same housing does not matter. Therefore, a plurality of apparatuses stored in separate housings and connected through a network and an apparatus storing a plurality of modules in one housing are both systems.

Note that the embodiment of the present disclosure is not limited to the embodiment described above, and various changes can be made without departing from the scope of the present disclosure.

For example, the present disclosure can be configured as cloud computing in which a plurality of apparatuses take charge and cooperate to process one function through a network.

In addition, one apparatus can execute each step described in the flow charts, or a plurality of apparatuses can take charge and execute each step.

Furthermore, in the case where one step includes a plurality of processes, one apparatus can execute the plurality of processes included in one step, or a plurality of apparatuses can take charge and execute the processes.

Note that the present disclosure can also be configured as follows.

<1>

A signal processing apparatus including:

a light projection unit that projects light at a predetermined wavelength;

a light-receiving unit that takes an image of an object with a reflectance higher than a predetermined reflectance by receiving reflected light of the light projected by the light projection unit and reflected by the object; and an orientation estimation unit that estimates own orientation on the basis of the image taken by the light-receiving unit.

<2>

The signal processing apparatus according to <1>, further including:

an object detection region extraction unit that obtains a difference image of an image in a state in which the light projection unit projects the light at the predetermined wavelength and an image in a state in which the light projection unit extinguishes the light at the predetermined wavelength and that extracts object detection regions that are regions with a luminance higher than a predetermined value, in which the orientation estimation unit estimates the own orientation on the basis of the object detection regions.

<3>

The signal processing apparatus according to <2>, in which the object detection region extraction unit extracts object detection regions in the difference image that are regions with a luminance higher than a predetermined value and with an area larger than a predetermined area.

<4>

The signal processing apparatus according to <2>, further including:

a first feature point extraction unit that extracts first feature points that are centers of gravity of the regions extracted as the object detection regions, in which the orientation estimation unit estimates the own orientation on the basis of information of the first feature points including the centers of gravity.

<5>

The signal processing apparatus according to <4>, further including:

an imaging unit that takes an image of a range where the light projection unit projects the light at the predetermined wavelength;

a second feature point extraction unit that extracts second feature points including corners from the image taken by the imaging unit;

an image usage orientation estimation unit that estimates an orientation on the basis of the second feature points including the corners; and an integration unit that integrates an estimation result of the own orientation obtained based on the image taken by the light-receiving unit and an image usage orientation estimation result that is the orientation estimated by the image usage orientation estimation unit.

<6>

The signal processing apparatus according to <5>, further including:

an acquisition unit that acquires GPS (Global Positioning System) data and IMU (Inertial Measurement Unit) data; and a GPS IMU usage orientation estimation unit that estimates an orientation on the basis of the GPS data and the IMU data acquired by the acquisition unit, in which the integration unit integrates the estimation result of the own orientation based on the image taken by the light-receiving unit, the image usage orientation estimation result that is the orientation estimated by the image usage orientation estimation unit, and a GPS IMU usage orientation estimation result that is the orientation estimated by the GPS IMU usage orientation estimation unit.

<7>

The signal processing apparatus according to <6>, further including:

a data acquisition situation detection unit that detects a data acquisition situation of the light-receiving unit, a data acquisition situation of the imaging unit, and a data acquisition situation of the GPS data and the IMU data, in which the integration unit weights and integrates the estimation result of the own orientation, the image usage orientation estimation result, and the GPS IMU usage orientation estimation result on the basis of the data acquisition situation of the light-receiving unit, the data acquisition situation of the imaging unit, and the data acquisition situation of the GPS data and the IMU data.

<8>

The signal processing apparatus according to <6>, in which the integration unit uses a Bayesian filter or an EKF (Extended Kalman Filter) to integrate the estimation result of the own orientation, the image usage orientation estimation result, and the GPS IMU usage orientation estimation result.

<9>

The signal processing apparatus according to <4>, in which the orientation estimation unit estimates the own orientation on the basis of SLAM (Simultaneous Localization And Mapping) using the information of the first feature points.

<10>

The signal processing apparatus according to any one of <1> to <9>, in which the object includes a reflector, a mirror, a road sign, or a center line on a road.

<11>

The signal processing apparatus according to any one of <1> to <10>, in which the wavelength of the light projected by the light projection unit is in a near-infrared band.

<12>

The signal processing apparatus according to any one of <1> to <11>, in which the light projection unit projects and extinguishes light at a plurality of wavelengths at predetermined intervals.

<13>

A signal processing method including:

a light projection process of projecting light at a predetermined wavelength;

a light-receiving process of taking an image of an object with a reflectance higher than a predetermined reflectance by receiving reflected light of the light projected in the light projection process and reflected by the object; and an orientation estimation process of estimating own orientation on the basis of the image taken in the light-receiving process.

<14>

A program causing a computer to execute processes including:

a light projection unit that projects light at a predetermined wavelength;

a light-receiving unit that takes an image of an object with a reflectance higher than a predetermined reflectance by receiving reflected light of the light projected by the light projection unit and reflected by the object; and an orientation estimation unit that estimates own orientation on the basis of the image taken by the light-receiving unit.

<15>
A moving body including:
  a light projection unit that projects light at a predetermined wavelength;
  a light-receiving unit that takes an image of an object with a reflectance higher than a predetermined reflectance by receiving reflected light of the light projected by the light projection unit and reflected by the object;
  an orientation estimation unit that estimates own orientation on the basis of the image taken by the light-receiving unit;
  a situation analysis unit that analyzes a situation on the basis of the orientation estimated by the orientation estimation unit;
  a planning unit that generates an action plan on the basis of an analysis result of the situation analysis unit; and
  a motion control unit that controls a motion on the basis of the action plan.

REFERENCE SIGNS LIST

11 Vehicle
102 Data acquisition unit
112 Automatic drive control unit
141 External information detection unit
201 Reflector usage orientation estimation unit
202 Image usage orientation estimation unit
203 GPS IMU usage orientation estimation unit
204 Data acquisition situation detection unit
205 Estimation result integration unit
221 Light projection adjustment unit
222 Light projection unit
223 Light-receiving unit
224 Reflector region extraction unit
225 Feature point extraction unit
226 Orientation estimation unit
241 Image acquisition unit
242 Feature point extraction unit
243 Orientation estimation unit
261 GPS IMU data acquisition unit
262 Orientation estimation unit
281 Light source unit
282 Filter wheel
291, 291a to 291d LEDs
311 Imaging unit
312 Filter wheel
331 Imaging element
331a to 331h Light-receiving elements

The invention claimed is:

1. A signal processing apparatus comprising:
  at least one processor; and
  at least one storage medium having encoded thereon executable instructions that, when executed by the at least one processor, cause the at least one processor to carry out a method comprising:
  projecting light at at least one predetermined wavelength not visible to a human eye;
  capturing an image of an object with a reflectance higher than a predetermined reflectance by receiving reflected light of the light projected in the projecting and reflected by the object;
  determining for the image one or more object detection regions that are regions with an intensity higher than a predetermined value;
  extracting for the one or more object detection regions of the image one or more first features that include one or more centers of gravity of the one or more object detection regions; and
  generating a first orientation estimate for an orientation of a body based at least in part on information regarding the object detection regions, the information regarding the object detection regions comprising the one or more first features that include the one or more centers of gravity.

2. The signal processing apparatus according to claim 1, wherein:
  the image is a first image captured in a state in which the light at the at least one predetermined wavelength is projected;
  the method further comprises obtaining a difference image between the first image in the state in which the light at the at least one predetermined wavelength is projected and a second image in a state in which the light at the at least one predetermined wavelength is not projected; and
  determining the one or more object detection regions for the image comprises identifying, using the difference image, one or more object detection regions that are regions in the difference image with an intensity higher than a predetermined value.

3. The signal processing apparatus according to claim 2, wherein
  determining the one or more object detection regions for the image comprises identifying, using the difference image, regions that are regions in the difference image with an intensity higher than the predetermined value and with an area larger than a predetermined area.

4. The signal processing apparatus according to claim 1, wherein the method further comprises:
  capturing a second image in at least one direction in which the light at the at least one predetermined wavelength is projected;
  extracting one or more second feature including one or more corners of objects depicted in the image from the second image;
  generating a second orientation estimate for the body based at least in part on the one or more second features including the one or more corners; and
  integrating the first orientation estimate and the second orientation estimate to generate an orientation estimate.

5. The signal processing apparatus according to claim 4, wherein:
  the method further comprises:
    acquiring GPS (Global Positioning System) data and/or IMU (Inertial Measurement Unit) data; and
    generating a third orientation estimate for the body based at least in part on the GPS data and/or the IMU data; and
  the integrating further comprises integrating to generate the orientation estimate, wherein the integrating to generate the orientation estimate comprises integrating the first orientation estimate, the second orientation estimate, and the third orientation estimate.

6. The signal processing apparatus according to claim 5, wherein:
  the method further comprises obtaining first capture condition information indicating one or more first conditions in which the image was captured, second capture condition information indicating one or more second conditions in which the second image was captured, and third acquisition condition information indicating one or more third conditions in which the GPS data and the IMU data was acquired; and integrating to generate the orientation estimate comprises weighing and integrating the first orientation estimate, the second orientation estimate, and the third orientation estimate based at least in part on the first capture condition information, the second capture condition information, and the third acquisition condition information.

7. The signal processing apparatus according to claim 5, wherein the integrating comprises using a Bayesian filter or an EKF (Extended Kalman Filter) to integrate the first orientation estimate, the second orientation estimate, and the third orientation estimate.

8. The signal processing apparatus according to claim 1, wherein
generating the first orientation estimate comprises generating the first orientation estimate based at least in part on a SLAM (Simultaneous Localization And Mapping) analysis using the information of the one or more first features.

9. The signal processing apparatus according to claim 1, wherein
the object includes a reflector, a mirror, a road sign, or a center line on a road.

10. The signal processing apparatus according to claim 1, wherein
the at least one predetermined wavelength of the light projected in the projecting includes light in a near-infrared band.

11. The signal processing apparatus according to claim 1, wherein
the at least one predetermined wavelength is a plurality of wavelengths; and
projecting the light comprises projecting and stopping projecting light, at the plurality of wavelengths, at an interval.

12. The signal processing apparatus according to claim 1, wherein generating the first orientation estimate for the orientation of the body comprises generating a first orientation estimate for a position and/or direction of the body.

13. The signal processing apparatus according to claim 12, wherein:
the body is a vehicle, the vehicle comprising the signal processing apparatus; and
generating the first orientation estimate for the position and/or direction of the body comprises generating a first orientation estimate for a position and/or direction of the vehicle.

14. A signal processing method comprising:
projecting light at at least one predetermined wavelength not visible to a human eye;
capturing an image of an object with a reflectance higher than a predetermined reflectance by receiving reflected light of the light projected in the projecting and reflected by the object;
determining for the image one or more object detection regions that are regions with an intensity higher than a predetermined value;
extracting for the one or more object detection regions of the image one or more first features that include one or more centers of gravity of the one or more object detection regions; and
generating a first orientation estimate for an orientation of a body based at least in part on information regarding the object detection regions, the information regarding the object detection regions comprising the one or more first features that include the one or more centers of gravity.

15. At least one non-transitory computer-readable storage medium having encoded thereon executable instructions that, when executed by at least one processor, cause the at least one processor to carry out a method comprising:
projecting light at at least one predetermined wavelength not visible to a human eye;
capturing an image of an object with a reflectance higher than a predetermined reflectance by receiving reflected light of the light projected in the projecting and reflected by the object;
determining for the image one or more object detection regions that are regions with an intensity higher than a predetermined value;
extracting for the one or more object detection regions of the image one or more first features that include one or more centers of gravity of the one or more object detection regions; and
generating a first orientation estimate for an orientation of a body based at least in part on information regarding the object detection regions, the information regarding the object detection regions comprising the one or more first features that include the one or more centers of gravity.

16. A vehicle comprising:
a signal processing apparatus comprising:
at least one processor; and
at least one storage medium having encoded thereon executable instructions that, when executed by the at least one processor, cause the at least one processor to carry out a method comprising:
projecting light at at least one predetermined wavelength not visible to a human eye;
capturing an image of an object with a reflectance higher than a predetermined reflectance by receiving reflected light of the light projected in the projecting and reflected by the object;
determining for the image one or more object detection regions that are regions with an intensity higher than a predetermined value;
extracting for the one or more object detection regions of the image one or more first features that include one or more centers of gravity of the one or more object detection regions;
generating a first orientation estimate for an orientation of a body based at least in part on information regarding the object detection regions, the information regarding the object detection regions comprising the one or more first features that include the one or more centers of gravity;
analyzing a situation on the basis of the orientation;
generating an action plan on the basis of a result of the analyzing; and
controlling a motion on the basis of the action plan.

* * * * *